(12) United States Patent
Kasuya et al.

(10) Patent No.: US 8,550,947 B2
(45) Date of Patent: Oct. 8, 2013

(54) TRANSMISSION APPARATUS AND SHIFT CONTROL APPARATUS

(75) Inventors: Satoru Kasuya, Nishio (JP); Masashi Kitou, Anjo (JP); Yuichi Seki, Okazaki (JP); Yusuke Takahashi, Anjo (JP); Ryosuke Kondo, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 73 days.

(21) Appl. No.: 13/137,868

(22) Filed: Sep. 20, 2011

(65) Prior Publication Data
US 2012/0088621 A1 Apr. 12, 2012

Related U.S. Application Data

(60) Provisional application No. 61/435,952, filed on Jan. 25, 2011.

(30) Foreign Application Priority Data

Sep. 28, 2010 (JP) .................................. 2010-216729
Feb. 28, 2011 (JP) .................................. 2011-043271

(51) Int. Cl.
*B60K 6/36* (2007.10)
(52) U.S. Cl.
USPC .................................................. 475/5; 477/5
(58) Field of Classification Search
None
See application file for complete search history.

(56) References Cited

U.S. PATENT DOCUMENTS

| 5,807,207 A | 9/1998 | Hisano et al. |
| 6,524,217 B1 * | 2/2003 | Murakami et al. ................. 477/5 |
| 7,878,281 B2 * | 2/2011 | Tanishima ................ 180/65.265 |
| 2002/0151409 A1 * | 10/2002 | Hayabuchi et al. ............ 477/158 |
| 2004/0102286 A1 * | 5/2004 | Tabata et al. ....................... 477/3 |
| 2008/0017427 A1 | 1/2008 | Nakanowatari |
| 2010/0069191 A1 * | 3/2010 | Swales et al. ...................... 475/5 |

FOREIGN PATENT DOCUMENTS

| JP | A-08-105496 | 4/1996 |
| JP | A-09-324854 | 12/1997 |
| JP | A-2008-044599 | 2/2008 |

OTHER PUBLICATIONS

Nov. 15, 2011 (mail date) Search Report issued in International Application No. PCT/JP2011/071319.
Schneider; "The New 8 Speed Hybrid Transmission from ZF—A Powertrain Innovation," PowerPoint Presentation; 4th CTI Symposium & Exhibition in U.S.A.; Jun. 8, 2010; pp. 1-22; ZF Sachs AG; Schweinfurt, Germany.
Schneider; "The New 8 Speed Hybrid Transmission from ZF—A Powertrain Innovation," 4th CTI Symposium & Exhibition in U.S.A.; all pages. ZF Sachs AG; Schweinfurt, Germany.

* cited by examiner

*Primary Examiner* — David D Le
*Assistant Examiner* — Mark Manley
(74) *Attorney, Agent, or Firm* — Oliff & Berridge, PLC

(57) ABSTRACT

A speed change device configured with an input member and an output member. The speed change device includes a speed change mechanism in which a plurality of shift speeds are established in accordance with respective engagement states of a plurality of friction engagement elements to transfer rotation of the input member to the output member. A slip travel mode is provided in which the vehicle is run while transferring torque from the input member to the output member with one of the friction engagement elements for establishment of each of the shift speeds caused to slip. A slip engagement element is the friction engagement element to be engaged commonly for establishment of at least a forward start shift speed and a reverse start shift speed.

11 Claims, 14 Drawing Sheets

|  | C1 | C2 | C3 | C4 | B1 | B2 |
|---|---|---|---|---|---|---|
| 1st | ○ |  |  |  |  | ○ a) |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev1 |  |  | ○ |  |  | ○ a) |
| Rev2 |  |  |  | ○ |  | ○ a) | a) SLIP ENGAGEMENT ELEMENT

|  | C1 | C2 | C3 | C4 | B1 | B2 |
|---|---|---|---|---|---|---|
| 1st | ○ |  |  |  |  | ○ a) |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  | ○ |  |  |
| Rev1 |  |  | ○ |  |  | ○ a) |
| Rev2 |  |  |  | ○ |  | ○ a) | a) SLIP ENGAGEMENT ELEMENT

|  | C1 | C2 | C3 | B1 | B2 |
|---|---|---|---|---|---|
| 1st | ○ |  |  |  | ○ a) |
| 2nd | ○ |  |  | ○ |  |
| 3rd | ○ |  | ○ |  |  |
| 4th | ○ | ○ |  |  |  |
| 5th |  | ○ | ○ |  |  |
| 6th |  | ○ |  | ○ |  |
| Rev1 |  |  | ○ |  | ○ a) | a) SLIP ENGAGEMENT ELEMENT

| | C1 | C2 | C3 | B1 | B2 |
|---|---|---|---|---|---|
| 1st | ○ | | | | ○ a) |
| 2nd | ○ | | | ○ | |
| 3rd | ○ | ○ | | | |
| 4th | | ○ | | ○ | |
| Rev1 | | | ○ | | ○ a) | a) SLIP ENGAGEMENT ELEMENT
( ): ENGINE BRAKE IN OPERATION

|  | C1 | C2 | C3 | B1 | B2 | B3 |
|---|---|---|---|---|---|---|
| 1st | ○ |  |  |  | ○ a) |  |
| 2nd | ○ |  |  |  |  | ○ |
| 3rd | ○ |  |  | ○ |  |  |
| 4th | ○ | ○ | ○ |  |  |  |
| 5th |  | ○ |  | ○ |  |  |
| 6th |  | ○ |  |  |  | ○ |
| Rev1 |  |  | ○ |  | ○ a) |  |
| Rev2 |  |  | ○ |  |  | ○ | a) SLIP ENGAGEMENT ELEMENT

FIG. 18

|     | C1 | C2 | C3 | B1 | B2 | B3 |
|-----|----|----|----|----|----|----|
| 1st |    | ○  |    |    | ○  | ○  |
| 2nd |    |    | ○  |    | ○  | ○  |
| 3rd |    | ○  | ○  |    | ○  | ○  |
| 4th | ○  | ○  | ○  |    |    | ○  |
| 5th | ○  | ○  |    |    | ○  | ○  |
| Rev1|    | ○  |    | ○  | ○  |    |

FIG. 19

|      | C1 | C2 | C3 | B1 | B2 | B3   |
|------|----|----|----|----|----|------|
| 1st  | ○  |    |    |    | ○  |      |
| 2nd  | ○  |    |    |    |    | ○ a) |
| 3rd  | ○  |    |    | ○  |    |      |
| 4th  | ○  | ○  | ○  |    |    |      |
| 5th  |    | ○  |    | ○  |    |      |
| 6th  |    | ○  |    |    |    | ○ a) |
| Rev1 |    |    | ○  |    | ○  |      |
| Rev2 |    |    | ○  |    |    | ○ a) | a) SLIP ENGAGEMENT ELEMENT

TRANSMISSION APPARATUS AND SHIFT CONTROL APPARATUS

INCORPORATION BY REFERENCE

The disclosure of Japanese Patent Applications No. 2010-216729 filed on Sep. 28, 2010 and No. 2011-043271 filed on Feb. 28, 2011, and U.S. Patent Application No. 61/435952 filed on Jan. 25, 2011, including the specification, drawings and abstract is incorporated herein by reference in its entirety.

BACKGROUND OF THE INVENTION

The present invention relates to a speed change device including an input member drivably coupled to an internal combustion engine and a rotary electric machine each serving as a drive force source for a vehicle, an output member drivably coupled to wheels, and a speed change mechanism in which a plurality of shift speeds are established in accordance with respective engagement states of a plurality of friction engagement elements to transfer rotation of the input member to the output member with the rotational speed changed with the speed ratio of each shift speed, and also relates to a shift control apparatus that controls the speed change device.

DESCRIPTION OF THE RELATED ART

A device disclosed in Japanese Patent Application Publication No. JP-A-2008-44599 mentioned below, for example, is known as a speed change device for a hybrid vehicle including an internal combustion engine and a rotary electric machine each serving as a drive force source for wheels. The hybrid vehicle does not include an element that absorbs variations in the rotational speed of the drive force source such as a torque converter. Therefore, in the technology according to JP-A-2008-44599, a friction engagement element provided in a speed change mechanism is controlled to a slipping engagement state to absorb the rotational speed of the drive force source when the vehicle starts to travel or is traveling at an extremely low speed, the internal combustion engine is started, or the like.

When the vehicle starts to travel or is traveling at a very low vehicle speed, the friction engagement element tends to be brought into the slipping engagement state over a long period, and the friction engagement element tends to produce much frictional heat through such slipping engagement. In the technology according to JP-A-2008-44599, different friction engagement elements are brought into the slipping engagement state for establishment of shift speeds that tend to produce particularly much frictional heat, namely a first shift speed to be established to start to travel forward and a reverse shift speed to be established to start to travel backward (paragraph [0053] of JP-A-2008-44599). Thus, in the technology according to JP-A-2008-44599, it is necessary to take measures against frictional heat due to the slipping engagement for a plurality of friction engagement elements.

SUMMARY OF THE INVENTION

Thus, there has been desired a speed change device and a shift control apparatus, for a hybrid vehicle that may be run with a friction engagement element for establishment of a shift speed brought into a slipping engagement state, that facilitate taking measures against frictional heat for the friction engagement element to be brought into the slipping engagement state.

According to a first aspect of the present invention, a speed change device includes an input member drivably coupled to an internal combustion engine and a rotary electric machine each serving as a drive force source for a vehicle, an output member drivably coupled to wheels, and a speed change mechanism in which a plurality of shift speeds are established in accordance with respective engagement states of a plurality of friction engagement elements to transfer rotation of the input member to the output member with a speed of the rotation changed with a speed ratio of each shift speed. In the speed change device, a slip travel mode is provided in which the vehicle is run while transferring torque from the input member to the output member with one of the friction engagement elements for establishment of the shift speed caused to slip; and a slip engagement element, which is the friction engagement element caused to slip in the slip travel mode, is the friction engagement element to be engaged commonly for establishment of at least a forward start shift speed, which is one of the shift speeds to be used for forward start, and a reverse start shift speed, which is one of the shift speeds to be used for reverse start.

The term "rotary electric machine" as used herein refers to any of a motor (electric motor), a generator (electric generator), and a motor generator that functions both as a motor and as a generator as necessary.

Also, the term "drivably coupled" as used herein refers to a state in which two rotary elements are coupled to each other in such a way that allows transfer of a drive force, which includes a state in which the two rotary elements are coupled to each other to rotate together with each other, and a state in which the two rotary elements are coupled to each other via one or two or more transmission members in such a way that allows transfer of a drive force. Examples of such transmission members include various members that transfer rotation at an equal speed or a changed speed, such as a shaft, a gear mechanism, a belt, and a chain. Additional examples of such transmission members include engagement elements that selectively transfer rotation and a drive force, such as a friction clutch and a meshing type clutch, for example. In the case where respective rotary elements of a differential gear device are "drivably coupled" to each other, however, it is intended that three or more rotary elements provided in the differential gear device are drivably coupled to each other via no other rotary element.

The term "speed ratio" as used herein refers to the ratio between the rotational speed of the input member and the rotational speed of the output member defined by the number of teeth of each gear for establishing a shift speed in the case where the shift speed is established in the speed change mechanism. In the present application, the speed ratio is a value obtained by dividing the rotational speed of the input member by the rotational speed of the output member.

According to the first aspect described above, in the slip travel mode, the vehicle is run while transferring torque from the input member to the output member with the friction engagement element caused to slip. Therefore, the friction engagement element may be slipping over a long period, depending on the running state of the vehicle, compared to a case where switching between shift speeds is executed over a relatively short period. Therefore, the slip engagement element which is caused to slip in the slip travel mode may produce much frictional heat. In the case where the slip travel mode is executed when the vehicle starts to travel forward or backward, when the vehicle is traveling at a low speed while the rotary electric machine is generating electric power using the drive force of the internal combustion engine, or the like, in particular, the difference in rotational speed between the input member and the output member tends to be large, and the slip travel mode tends to be executed over a long period. Thus, it is necessary to enhance the cooling capability and the heat-resistant performance against frictional heat for the slip engagement element, which is caused to slip in the slip travel mode on such occasions, compared to other friction engagement elements.

According to the first aspect described above, the slip engagement element is used commonly for the forward start shift speed and the reverse start shift speed. Thus, it is only necessary to enhance the cooling capability and the heat-resistant performance against frictional heat produced in the slip travel mode intensively for the single friction engagement element. Accordingly, it is possible to reduce the manufacturing cost and the size of the speed change device compared to a case where the cooling capability and the heat-resistant performance are to be enhanced for a plurality of friction engagement elements.

In the slip travel mode, the vehicle is run while transferring torque from the input member to the output member with the friction engagement element caused to slip. Therefore, variations in transfer torque of the friction engagement element cause variations in acceleration and deceleration characteristics of the vehicle. Thus, it is necessary to enhance the accuracy in controlling the transfer torque of the slip engagement element which is caused to slip in the slip travel mode. According to the characteristic configuration described above, the slip engagement element is used commonly for the forward start shift speed and the reverse start shift speed. Thus, it is only necessary to enhance the accuracy in controlling the transfer torque intensively for the single friction engagement element. Accordingly, it is possible to reduce the manufacturing cost and the size of the speed change device compared to a case where the accuracy in controlling the transfer torque is to be enhanced for a plurality of friction engagement elements.

According to a second aspect of the present invention, the slip engagement element may be the friction engagement element to be disengaged for establishment of a forward shift speed with the second lowest speed ratio next to the speed ratio of the forward start shift speed.

According to the second aspect, the slip engagement element which has produced heat in the slip travel mode for the forward start shift speed can be disengaged and cooled for the forward shift speed with the second lowest speed ratio. For a wet friction engagement element, in particular, coolant can be introduced into spaces between the friction plates in the disengaged state. Thus, the cooling capability for the slip engagement element can be improved.

According to a third aspect of the present invention, the plurality of friction engagement elements may include at least a clutch and a brake, and the slip engagement element may be the brake.

According to the third aspect, the slip engagement element is a brake which is a friction engagement element with one of its members fixed to a non-rotary member. Accordingly, in the case where the slip engagement element includes a servo mechanism, the servo mechanism can be provided in the non-rotary member. This makes it possible to suppress a centrifugal force acting on the servo mechanism due to rotation of the input member and the output member of the speed change device, and makes it easy to improve the accuracy in controlling the transfer torque of the slip engagement element, compared to a case where the slip engagement element is a clutch. In the case where a hydraulic pressure is used for the servo mechanism, in particular, variations in hydraulic pressure due to the centrifugal force can be suppressed, enhancing the effect of improving the accuracy in controlling the transfer torque.

In addition, a cooling mechanism for the slip engagement element can be disposed on the side of the non-rotary member. Thus, the cooling mechanism can be disposed easily, which makes it easy to improve the cooling capability.

In the case where the brake is fixed to a case that houses the speed change mechanism, the brake can be disposed outside the speed change mechanism to increase the outside dimension of the brake. This makes it easy to increase the friction surface area, and therefore makes it easy to improve the cooling capability and the heat-resistant performance by diffusing frictional heat, and to improve the accuracy in controlling the transfer torque.

According to a fourth aspect of the present invention, the plurality of friction engagement elements may be brakes or clutches; the speed change mechanism may include a differential gear device including at least four rotary elements that are a first rotary element, a second rotary element, a third rotary element, and a fourth rotary element in the order of rotational speed; the first rotary element may be configured to receive torque transferred from the input member through engagement of a third clutch, and to be fixed to a non-rotary member through engagement of a first brake; the second rotary element may be configured to receive torque transferred from the input member through engagement of a second clutch, and to be fixed to a non-rotary member through engagement of a second brake; the third rotary element may be drivably coupled to the output member; the fourth rotary element may be configured to receive torque transferred from the input member through engagement of a first clutch; and the slip engagement element may be the second brake.

According to the fourth aspect, the rotational speed of the third rotary element, which is drivably coupled to the output member, and the rotational speed of the second rotary element, which is configured to be fixed to a non-rotary member through engagement of the second brake serving as the slip engagement element, can be controlled to a rotational speed between the rotational speed of the first rotary element, which is configured to receive torque transferred from the input member through engagement of the third clutch, and the rotational speed of the fourth rotary element, which is configured to receive torque transferred from the input member through engagement of the first clutch. Accordingly, a forward shift speed with a high speed ratio with which a positive rotational speed is transferred to the output member can be established through engagement of the first clutch and engagement of the second brake, and a reverse shift speed with which a negative rotational speed is transferred to the output member can be established through engagement of the third clutch and engagement of the second brake. Thus, with the second brake serving as the slip engagement element, the slip engagement element can be used commonly for the forward start shift speed and the reverse start shift speed.

In order to achieve the foregoing object, according to a fifth aspect of the present invention, a shift control apparatus controls a speed change device including an input member drivably coupled to an internal combustion engine and a rotary electric machine each serving as a drive force source for a vehicle, an output member drivably coupled to wheels, and a speed change mechanism in which a plurality of shift speeds are established in accordance with respective engagement states of a plurality of friction engagement elements to transfer rotation of the input member to the output member with a speed of the rotation changed with a speed ratio of each of the shift speeds. In the shift control apparatus, a slip travel mode, in which the vehicle is run while transferring torque from the input member to the output member with one of the friction engagement elements for establishment of the shift speed caused to slip, can be executed, and a slip engagement element, which is the friction engagement element caused to slip in the slip travel mode, is the friction engagement element to be engaged commonly for establishment of at least a forward start shift speed, which is one of the shift speeds to be used for forward start, and a reverse start shift speed, which is one of the shift speeds to be used for reverse start.

The shift control apparatus can also achieve functions and effects that are similar to those achieved by the speed change device discussed above, and may be integrated with several additional features enumerated as the preferable examples of the configuration of the speed change device discussed above.

BRIEF DESCRIPTION OF THE DRAWINGS

FIG. 18 is an operation table of the speed change device according to the different embodiment of the present invention; and FIG. 19 is another example of the operation table of the speed change device according to the fourth embodiment of the present invention.

DETAILED DESCRIPTION OF THE EMBODIMENTS

[First Embodiment]

Figure 1:
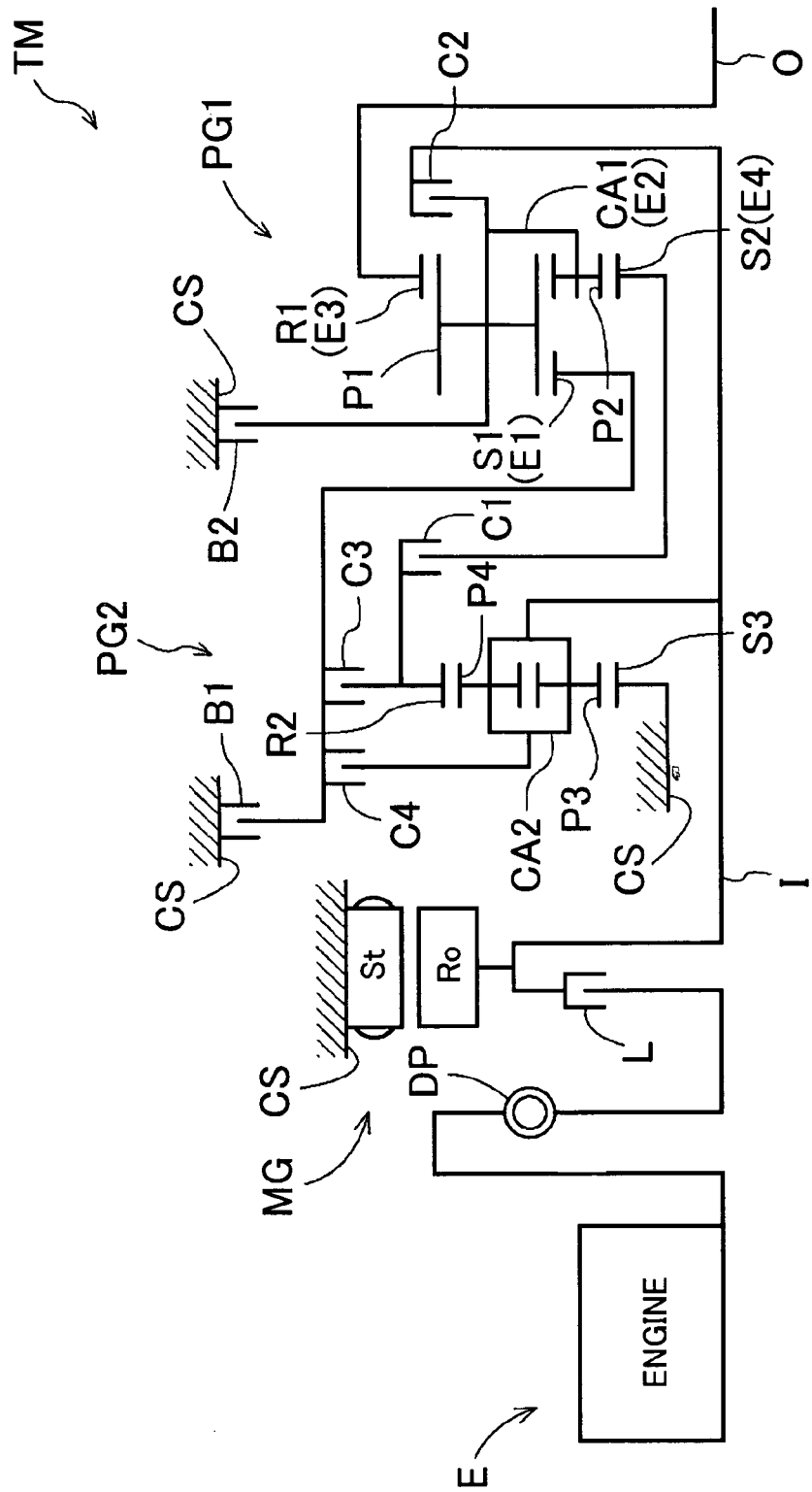
FIG. 1 is a skeleton diagram of a speed change device according to a first embodiment of the present invention.
Figure 4:
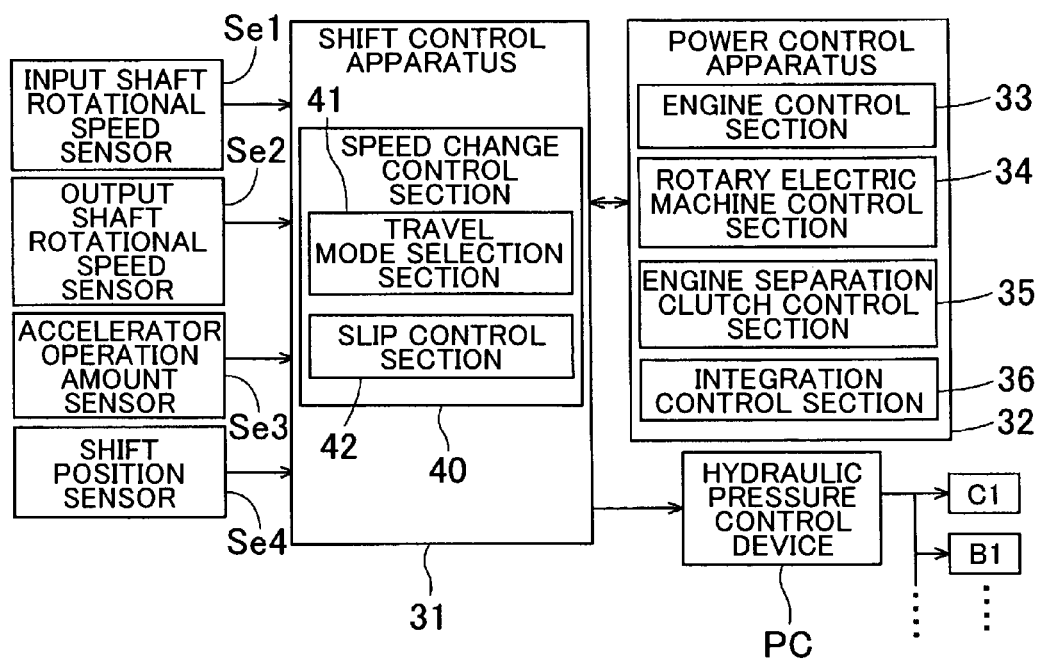
FIG. 4 is a block diagram showing the configuration of a shift control apparatus according to the first embodiment of the present invention.

A speed change device 1 according to a first embodiment of the present invention will be described with reference to the drawings. FIG. 1 is a skeleton diagram of the speed change device 1 according to the present embodiment. As shown in the drawing, a vehicle incorporating the speed change device 1 is a hybrid vehicle including an engine E, which is an internal combustion engine, and a rotary electric machine MG each serving as a drive force source for the vehicle. The speed change device 1 includes an input shaft I serving as an input member drivably coupled to the engine E and the rotary electric machine MG, an output shaft O serving as an output member drivably coupled to the wheels, and a speed change mechanism TM in which a plurality of shift speeds are established in accordance with engagement states of a plurality of friction engagement elements C1, B1, . . . to transfer rotation of the input shaft I to the output shaft O with the rotational speed of the input shaft I changed with the speed ratio of each shift speed. In the present embodiment, the speed change device 1 includes an engine separation clutch L that selectively drivably couples the input shaft I to the engine E. As shown in FIG. 4, the speed change device 1 also includes a shift control apparatus 31 that controls that speed change device 1.

The speed change device 1 according to the present embodiment configured as described above is provided with a slip travel mode in which the vehicle is run while transferring torque from the input shaft I to the output shaft O with one of the friction engagement elements C1, B1, . . . for establishment of a shift speed caused to slip. The speed change device 1 according to the present embodiment is characterized in that a slip engagement element B2, which is a friction engagement element caused to slip in the slip travel mode, is a friction engagement element to be engaged commonly for establishment of at least a forward start shift speed, which is one of the shift speeds to be used for forward start, and a reverse start shift speed, which is one of the shift speeds to be used for reverse start. The speed change device 1 and the shift control apparatus 31 according to the present embodiment will be described in detail below.

1. Configuration of Drive/Transfer System of Hybrid Vehicle

First, the configuration of the drive/transfer system of the hybrid vehicle according to the present embodiment will be described. As shown in FIG. 1, the hybrid vehicle is a parallel-type hybrid vehicle which includes the engine E and the rotary electric machine MG each serving as a drive force source for the vehicle, and in which the engine E and the rotary electric machine MG are drivably coupled to each other in series. The hybrid vehicle includes the speed change mechanism TM, which transfers to the output shaft O rotation of the engine E and the rotary electric machine MG transferred to the input shaft I with the rotational speeds of the engine E and the rotary electric machine MG changed and torque converted.

The engine E is an internal combustion engine driven by combustion of fuel. Various engines known in the art such as a gasoline engine and a diesel engine, for example, may be used as the engine E. In the example, an output rotary shaft such as a crankshaft of the engine E is selectively drivably coupled to the input shaft I via the engine separation clutch L. That is, the input shaft I of the speed change device 1 is selectively drivably coupled to the engine E via the engine separation clutch L. The engine separation clutch L is a friction engagement element that connects and disconnects the engine E and the input shaft I to and from each other under control performed by a power control apparatus 32 (see FIG. 4). In the present embodiment, the engine separation clutch L is basically controlled to a direct-coupling engagement state, in which there is no slipping, so that the engine E and the input shaft I rotate together with each other. The output rotary shaft of the engine E is drivably coupled to an input member of the engine separation clutch L via a damper DP.

The rotary electric machine MG includes a stator St fixed to a case CS and a rotor Ro supported radially inwardly of the stator St so as to be freely rotatable. The rotor Ro of the rotary electric machine MG is drivably coupled to the input shaft I so as to rotate together with the input shaft I. That is, in the present embodiment, both the engine E and the rotary electric machine MG are drivably coupled to the input shaft I. The rotary electric machine MG is electrically connected to a battery (not shown) serving as an electricity accumulation device. The rotary electric machine MG can function as a motor (electric motor) that is supplied with electric power to produce power and as a generator (electric generator) that is supplied with power to generate electric power. That is, the rotary electric machine MG performs power running using electric power supplied from the battery, or generates electric power using a rotational drive force transferred from the engine E or the wheels to accumulate the generated electric power in the battery. The battery is an example of the electricity accumulation device. Other types of electricity accumulation devices such as a capacitor may be used, or a plurality of types of electricity accumulation devices may be used in combination. In the following description, electric power generation performed by the rotary electric machine MG is referred to as "regeneration", and negative torque output from the rotary electric machine MG during electric power generation is referred to as "regenerative torque". In the case where target output torque of the rotary electric machine is negative torque, the rotary electric machine MG outputs regenerative torque while generating electric power using a rotational drive force transferred from the engine E or the wheels.

The speed change mechanism TM is drivably coupled to the input shaft I, to which the drive force source is drivably coupled. In the present embodiment, the speed change mechanism TM is a stepped automatic transmission that provides a plurality of shift speeds with different speed ratios. In order to establish the plurality of shift speeds, the speed change mechanism TM includes a gear mechanism such as a planetary gear mechanism and a plurality of friction engagement elements B1, C1 . . . The speed change mechanism TM transfers rotation of the input shaft I to the output shaft O with the rotational speed of the input shaft I changed with the speed ratio of each shift speed and torque converted. The torque transferred from the speed change mechanism TM to the output shaft O is distributed and transferred to the two, left and right, wheels via a differential device or the like. Here, the term "speed ratio" refers to the ratio of the rotational speed of the input member to the rotational speed of the output member in the case where each shift speed is established in the speed change mechanism TM. In the present application, the speed ratio refers to a value obtained by dividing the rotational speed of the input shaft I by the rotational speed of the output shaft O. That is, the rotational speed of the output shaft O is obtained by dividing the rotational speed of the input shaft I by the speed ratio. In addition, the torque transferred from the speed change mechanism TM to the output shaft O is obtained by multiplying torque transferred from the input shaft I to the speed change mechanism TM by the speed ratio.

In the example, the plurality of friction engagement elements B1, C1, . . . are each an engagement element such as a clutch and a brake formed to include friction members. Each of the friction engagement elements B1, C1, . . . can be continuously controlled such that the transfer torque capacity of the friction engagement element is increased and decreased by controlling the engagement pressure of the friction engagement element by controlling the supplied hydraulic pressure. A wet multi-plate clutch and a wet multi-plate brake, for example, may be suitably used as the friction engagement elements.

A friction engagement element transfers torque between input and output members of the friction engagement element through friction between the input and output members. In the case where there is a difference in rotational speed (slipping) between the input and output members of the friction engagement element, torque with the magnitude of the transfer torque capacity is transferred from a member with a higher rotational speed to a member with a lower rotational speed. In the case where there is no difference in rotational speed (slipping) between the input and output members of the friction engagement element, the friction engagement element transfers torque up to the magnitude of the transfer torque capacity that acts on the input and output members of the friction engagement element. Here, the term "transfer torque capacity" refers to the magnitude of maximum torque that can be transferred by a friction engagement element through friction. The magnitude of the transfer torque capacity varies in proportion to the engagement pressure of the friction engagement element. The term "engagement pressure" refers to a pressure that presses input-side friction plates and output-side friction plates against each other. In the present embodiment, the engagement pressure varies in proportion to the magnitude of the supplied hydraulic pressure. That is, in the present embodiment, the magnitude of the transfer torque capacity varies in proportion to the magnitude of the hydraulic pressure supplied to the friction engagement element.

Each of the friction engagement elements of the speed change mechanism TM includes a return spring, and is urged to be disengaged by the reaction force of the spring. When a force produced by the hydraulic pressure supplied to the friction engagement element exceeds the reaction force of the spring, the friction engagement element starts producing the transfer torque capacity to bring the friction engagement element from the disengaged state into the engaged state. The hydraulic pressure at which the transfer torque capacity starts being produced is referred to as a "stroke end pressure". Each of the friction engagement elements is configured such that the transfer torque capacity of the friction engagement element increases in proportion to an increase in supplied hydraulic pressure after the supplied hydraulic pressure exceeds the stroke end pressure.

In the present embodiment, the term "engaged state" refers to a state in which a friction engagement element is producing a transfer torque capacity. The term "disengaged state" refers to a state in which a friction engagement element is not producing a transfer torque capacity. The term "slipping engagement state" refers to an engagement state in which there is slipping between input and output members of a friction engagement element. The term "direct-coupling engagement state" refers to an engagement state in which there is no slipping between input and output members of a friction engagement element.

2. Configuration of Speed Change Mechanism

As shown in FIG. 1, the speed change mechanism TM is formed by assembling two differential gear devices PG1 and PG2 to each other. In addition, the speed change mechanism TM includes, as a plurality of friction engagement elements, a first clutch C1, a second clutch C2, a third clutch C3, a fourth clutch C4, a first brake B1, and a second brake B2. The speed change device 1 includes a case CS serving as a non-rotary member that houses various members of the speed change mechanism. In the present embodiment, the case CS is a cylindrical member that covers at least the radially outer side of the various members of the speed change mechanism, and is fixed to the vehicle. Friction plates on one side of each of the first brake B1 and the second brake B2 are fixed to the case CS.

Figures 2, 3:
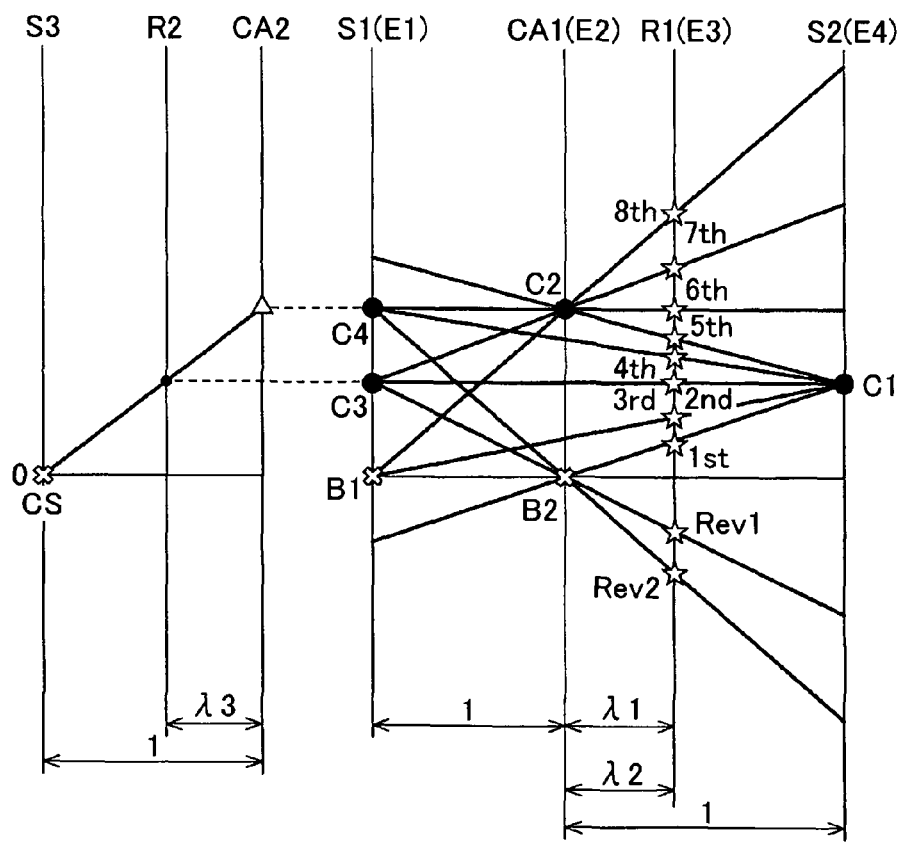
FIG. 2 is an operation table of the speed change device according to the first embodiment of the present invention.
FIG. 3 is a velocity diagram of the speed change device according to the first embodiment of the present invention.

FIG. 2 is an operation table of the friction engagement elements C1, C2, C3, C4, B1, and B2. In the operation table, the symbol "○" indicates that each friction engagement element is in the engaged state. Meanwhile, the presence of "no symbol" indicates that each friction engagement element is in the disengaged state. In the speed change mechanism TM, as shown in the operation table, each shift speed is selectively established by bringing two of the friction engagement elements into the engaged state and bringing the remaining friction engagement elements into the disengaged state.

In FIG. 2, "1st" indicates a first shift speed, "2nd" indicates a second shift speed, "3rd" indicates a third shift speed, "4th" indicates a fourth shift speed, "5th" indicates a fifth shift speed, "6th" indicates a sixth shift speed, "7th" indicates a seventh shift speed, "8th" indicates an eighth shift speed, "Rev1" indicates a first reverse shift speed, and "Rev2" indicates a second reverse shift speed. In the present embodiment, the forward shift speeds are the first shift speed, the second shift speed, ..., the eighth shift speed in the descending order of speed ratio with which rotation of the input shaft I is transferred to the output shaft O. This also applies to the reverse shift speeds, which are the first reverse shift speed and the second reverse shift speed in the descending order of speed ratio.

In the present embodiment, the first shift speed is used as a forward start shift speed, which is one of the shift speeds to be used for forward start, and the first reverse shift speed is used as a reverse start shift speed, which is one of the shift speeds to be used for reverse start. The second brake B2, which is brought into the engaged state for establishment of the first shift speed, serves as a slip engagement element, which is a friction engagement element that is caused to slip in the slip travel mode for the first shift speed. Meanwhile, the second brake B2, which is brought into the engaged state for establishment of the first reverse shift speed, serves as a slip engagement element, which is a friction engagement element that is caused to slip in the slip travel mode for the first reverse shift speed. Thus, the second brake B2 serving as the slip engagement element serves as a friction engagement element to be engaged commonly for establishment of at least the forward start shift speed and the reverse start shift speed. In the present embodiment, the second brake B2 serving as the slip engagement element is also engaged for establishment of the second reverse shift speed. Thus, only the second reverse shift speed may be used as the reverse start shift speed to be used for reverse start, and both the first reverse shift speed and the second reverse shift speed may be selectively used as the reverse start shift speed.

Accordingly, in the present embodiment, the slip engagement element is used commonly for the forward start shift speed and the reverse start shift speed. Thus, it is only necessary to enhance the cooling capability and the heat-resistant performance against frictional heat produced in the slip travel mode, and to enhance the accuracy in controlling the transfer torque, intensively for the second brake B2. Accordingly, it is possible to reduce the manufacturing cost and the size of the speed change device 1 compared to a case where the cooling capability, the heat-resistant performance, and the accuracy in controlling the transfer torque are to be enhanced for the first clutch C1 and the third clutch C3.

In the present embodiment, the slip engagement element is the second brake B2, the friction plates on one side of which are fixed to the case CS serving as a non-rotary member. A servo mechanism for the second brake B2 such as a hydraulic cylinder is provided in a member fixed to the case CS, and formed as a non-rotary member. This makes it possible to suppress a centrifugal force acting on the servo mechanism due to rotation of a carrier CA1 of the first differential gear device PG1, to which friction plates on the other side of the second brake B2 are fixed, and makes it easy to improve the accuracy in controlling the transfer torque of the slip engagement element. In particular, variations in hydraulic pressure within the hydraulic cylinder due to the centrifugal force can be suppressed, enhancing the effect of improving the accuracy in controlling the transfer torque.

In the present embodiment, a path for supplying coolant (oil) for cooling is disposed to extend from the case CS side to the second brake B2. Accordingly, the coolant supply path can be disposed easily, and the cooling capability for the slip engagement element can be improved, compared to a case where the coolant supply path is disposed to extend from the rotary member side. The second brake B2 is disposed along the inner peripheral surface of the case CS which covers the radially outer side of the various members of the speed change mechanism. Thus, the friction plates have a large outside diameter and a large friction surface area. This makes it easy to improve the cooling capability and the heat-resistant performance by diffusing frictional heat produced in the slip travel mode, and to improve the accuracy in controlling the transfer torque. This also makes it possible to cool the slip engagement element from outside the case CS, which makes it easy to improve the cooling capability. In order to improve the accuracy in controlling the transfer torque of the slip engagement element, for example, various contrivances may be made in designing and manufacturing the mechanism, such as elaborating on the arrangement of a return spring of a hydraulic piston forming the servo mechanism to make the spring load acting on the hydraulic piston uniform, reducing the error in the manufacture of various members forming the slip engagement element such as friction members, a hydraulic piston, a return spring, a hydraulic cylinder, and a hydraulic circuit, and so forth.

The second brake B2 serving as the slip engagement element is disengaged for establishment of the second shift speed with the second lowest speed ratio next to the speed ratio of the first shift speed used as the forward start shift speed. The second brake B2, which has produced heat in the slip travel mode for the first shift speed, can be disengaged and cooled for the second shift speed with the second lowest speed ratio. In the present embodiment, further, the second brake B2 is a wet friction engagement element, and coolant can be introduced into spaces between the friction plates when the friction plates are in the disengaged state. Thus, the cooling capability for the slip engagement element can be improved.

Next, returning to FIG. 1, the skeleton diagram of the speed change mechanism TM according to the present embodiment will be described. The second differential gear device PG2 is formed by a double-pinion planetary gear mechanism disposed coaxially with the input shaft I. That is, the second differential gear device PG2 is a differential gear device including three rotary elements, namely a carrier CA2 that supports a plurality of sets of pinion gears P3 and P4, a sun gear S3 that meshes with the pinion gears P3, and a ring gear R2 that meshes with the pinion gears P4. The three rotary elements of the second differential gear device PG2 are the sun gear S3, the ring gear R2, and the carrier CA2 in the order of rotational speed.

The carrier CA2 of the second differential gear device PG2 is drivably coupled to the input shaft I so as to rotate together with the input shaft I. A drive force transferred from the drive force source to the input shaft I is transferred to the carrier CA2. The carrier CA2 is configured to be drivably coupled to a first sun gear S1 of the first differential gear device PG1 through engagement of the fourth clutch C4. The sun gear S3 of the second differential gear device PG2 is fixed to the case CS serving as a non-rotary member. The ring gear R2 of the second differential gear device PG2 is configured to be drivably coupled to a second sun gear S2 of the first differential gear device PG1 through engagement of the first clutch C1, and to be drivably coupled to the first sun gear S1 of the first differential gear device PG1 through engagement of the third clutch C3.

On the other hand, the first differential gear device PG1 is formed by a Ravigneaux planetary gear device disposed coaxially with the input shaft I. Here, the Ravigneaux planetary gear device is formed by a single-pinion planetary gear mechanism that uses pinion gears P1 and a double-pinion planetary gear mechanism that uses sets of pinion gears P1 and P2, the planetary gear mechanisms sharing the pinion gears P1, the carrier CA1, and a ring gear R1. Specifically, the first differential gear device PG1 is a differential gear device including four rotary elements, namely the first sun gear S1, the second sun gear S2, the ring gear R1, and the common carrier CA1 which supports the long pinion gears PI and the short pinion gears P2. The four rotary elements of the first differential gear device PG1 are assumed to be a first rotary element E1, a second rotary element E2, a third rotary element E3, and a fourth rotary element E4 in the order of rotational speed. Then, in the present embodiment, the first sun gear S1 corresponds to the first rotary element E1, the carrier CA1 corresponds to the second rotary element E2, the ring gear R1 corresponds to the third rotary element E3, and the second sun gear S2 corresponds to the fourth rotary element E4.

In the present embodiment, the first sun gear S1 serving as the first rotary element E1 is configured to receive torque of the drive force source, which has been transferred from the input shaft I to the ring gear R2 via the carrier CA2 of the second differential gear device PG2, through engagement of the third clutch C3. The first sun gear S1 is also configured to receive torque of the drive force source, which has been transferred from the input shaft I to the carrier CA2 of the second differential gear device PG2, through engagement of the fourth clutch C4. The first sun gear S1 is further configured to be fixed to the case CS through engagement of the first brake B1.

The carrier CA1 serving as the second rotary element E2 is configured to receive torque of the drive force source, which has been transferred from the input shaft I, through engagement of the second clutch C2. The carrier CA1 serving as the second rotary element E2 is also configured to be fixed to the case CS through engagement of the second brake B2.

The ring gear R1 serving as the third rotary element E3 is drivably coupled to the output shaft O.

The second sun gear S2 serving as the fourth rotary element E4 is configured to receive torque of the drive force source, which has been transferred from the input shaft I to the ring gear R2 via the carrier CA2 of the second differential gear device PG2, through engagement of the first clutch C1.

The friction engagement elements are selectively engaged on the basis of the operation table shown in FIG. 2 to establish each shift speed. FIG. 3 is a velocity diagram of the speed change mechanism TM according to the present embodiment. As shown in FIGS. 2 and 3, the first shift speed is established through engagement of the first clutch C1 and engagement of the second brake B2. That is, with the first clutch C1 engaged, the rotational drive force of the input shaft I input to the carrier CA2 of the second differential gear device PG2 is reduced in speed on the basis of the tooth number ratio $\lambda 3$ to be transferred to the second sun gear S2 of the first differential gear device PG1. With the second brake B2 engaged, the carrier CA1 of the first differential gear device PG1 is fixed to the case CS. This allows the rotational drive force of the second sun gear S2 to be further reduced in speed on the basis of the tooth number ratio $\lambda 2$ to be transferred to the output shaft O. In the present embodiment, the second brake B2, which is brought into the engaged state for establishment of the first shift speed, is brought into the slipping engagement state, in which there is slipping between input and output members of the second brake B2, in the slip travel mode. That is, the second brake B2 serves as the slip engagement element according to the present invention. In the slipping engagement state, the torque relationship and the rotational speed relationship vary in accordance with the amount of slipping. In the present embodiment, the first shift speed is used as the forward start shift speed, which is one of the shift speeds to be used for forward start.

The second shift speed is established through engagement of the first clutch C1 and engagement of the first brake B1. That is, with the first clutch C1 engaged, the rotational drive force of the input shaft I input to the carrier CA2 of the second differential gear device PG2 is reduced in speed on the basis of the tooth number ratio $\lambda 3$ to be transferred to the second sun gear S2 of the first differential gear device PG1. With the first brake B1 engaged, the first sun gear S1 of the first differential gear device PG1 is fixed to the case CS. Then, the rotational drive force of the second sun gear S2 is further reduced in speed on the basis of the tooth number ratios $\lambda 1$ and $\lambda 2$ to be transferred to the output shaft O.

The third shift speed is established through engagement of the first clutch C1 and engagement of the third clutch C3. That is, with the first clutch C1 engaged, the rotational drive force of the input shaft I input to the carrier CA2 of the second differential gear device PG2 is reduced in speed on the basis of the tooth number ratio $\lambda 3$ to be transferred to the second sun gear S2 of the first differential gear device PG1. With the third clutch C3 engaged, the rotational drive force of the input shaft I is reduced in speed on the basis of the tooth number ratio $\lambda 3$ to be transferred to the second sun gear S2 of the first differential gear device PG1. Then, with the first sun gear S1 and the second sun gear S2 rotating at the same speed as each other, the rotational drive force of the input shaft I which has been reduced in speed on the basis of the tooth number ratio $\lambda 3$ is transferred as it is to the output shaft O.

The fourth shift speed is established through engagement of the first clutch C1 and engagement of the fourth clutch C4. That is, with the first clutch C1 engaged, the rotational drive force of the input shaft I input to the carrier CA2 of the second differential gear device PG2 is reduced in speed on the basis of the tooth number ratio $\lambda 3$ to be transferred to the second sun gear S2 of the first differential gear device PG1. With the fourth clutch C4 engaged, the rotational drive force of the input shaft I is transferred as it is to the first sun gear S1 of the first differential gear device PG1. Then, the rotational drive force of the input shaft I, which is determined on the basis of the respective rotational speeds of the first sun gear S1 and the second sun gear S2 and the tooth number ratios λ1 and λ2, is transferred to the output shaft O.

The fifth shift speed is established through engagement of the first clutch C1 and engagement of the second clutch C2. That is, with the first clutch C1 engaged, the rotational drive force of the input shaft I input to the carrier CA2 of the second differential gear device PG2 is reduced in speed on the basis of the tooth number ratio λ3 to be transferred to the second sun gear S2 of the first differential gear device PG1. With the second clutch C2 engaged, the rotational drive force of the input shaft I is transferred as it is to the carrier CA1 of the first differential gear device PG1. Then, the rotational drive force of the input shaft I, which is determined on the basis of the respective rotational speeds of the carrier CA1 and the second sun gear S2 and the tooth number ratio λ2, is transferred to the output shaft O.

The sixth shift speed is established through engagement of the second clutch C2 and engagement of the fourth clutch C4. That is, with the second clutch C2 engaged, the rotational drive force of the input shaft I is transferred as it is to the carrier CA1 of the first differential gear device PG1. With the fourth clutch C4 engaged, the rotational drive force of the input shaft I is transferred as it is to the first sun gear S1 of the first differential gear device PG1. Then, with the carrier CA1 and the first sun gear S1 rotating at the same speed as each other, the rotational drive force of the input shaft I is transferred as it is to the output shaft O.

The seventh shift speed is established through engagement of the second clutch C2 and engagement of the third clutch C3. That is, with the second clutch C2 engaged, the rotational drive force of the input shaft I is transferred as it is to the carrier CA1 of the first differential gear device PG1. With the third clutch C3 engaged, the rotational drive force of the input shaft I is reduced in speed on the basis of the tooth number ratio λ3 to be transferred to the first sun gear S1 of the first differential gear device PG1. Then, the rotational drive force of the input shaft I, which is determined on the basis of the respective rotational speeds of the first sun gear S1 and the carrier CA1 and the tooth number ratio λ1, is transferred to the output shaft O.

The eighth shift speed is established through engagement of the second clutch C2 and engagement of the first brake B1. That is, with the second clutch C2 engaged, the rotational drive force of the input shaft I is transferred as it is to the carrier CA1 of the first differential gear device PG1. With the first brake B1 engaged, the first sun gear S1 of the first differential gear device PG1 is fixed to the case CS. Then, the rotational drive force of the input shaft I is increased in speed on the basis of the tooth number ratio λ1 to be transferred to the output shaft O.

The first reverse shift speed is established through engagement of the third clutch C3 and engagement of the second brake B2. That is, with the third clutch C3 engaged, the rotational drive force of the input shaft I input to the carrier CA2 of the second differential gear device PG2 is reduced in speed on the basis of the tooth number ratio λ3 to be transferred to the first sun gear S1 of the first differential gear device PG1. With the second brake B2 engaged, the carrier CA1 of the first differential gear device PG1 is fixed to the case CS. This allows the rotational drive force of the first sun gear S1 to be reduced in speed on the basis of the tooth number ratio λ1 and reversed to be transferred to the output shaft O. In the present embodiment, the second brake B2, which is brought into the engaged state for establishment of the first reverse shift speed, is brought into the slipping engagement state, in which there is slipping between input and output members of the second brake B2, in the slip travel mode. That is, the second brake B2 serves as the slip engagement element according to the present invention. In the slipping engagement state, the torque relationship and the rotational speed relationship vary in accordance with the amount of slipping. In the present embodiment, the first reverse shift speed is used as the reverse start shift speed, which is one of the shift speeds to be used for reverse start.

The second reverse shift speed is established through engagement of the fourth clutch C4 and engagement of the second brake B2. That is, with the fourth clutch C4 engaged, the rotational drive force of the input shaft I is transferred as it is to the first sun gear S1 of the first differential gear device PG1. With the second brake B2 engaged, the carrier CA1 of the first differential gear device PG1 is fixed to the case CS. Then, the rotational drive force of the input shaft I is reduced in speed on the basis of the tooth number ratio λ1 and reversed to be transferred to the output shaft O. In the case where the second reverse shift speed is used as the reverse start shift speed, the slip travel mode is also executed for the second reverse shift speed. Then, the second brake B2 is brought into the slipping engagement state in the slip travel mode for the second reverse shift speed. In this case, the second reverse shift speed is used as the reverse start shift speed.

As shown in FIG. 3, the rotational speed of the ring gear R1 (third rotary element E3), which is drivably coupled to the output shaft O, and the rotational speed of the carrier CA1 (second rotary element E2), which is configured to be fixed to the case CS through engagement of the second brake B2, can be controlled to a rotational speed between the rotational speed of the first sun gear (first rotary element E1), which is configured to receive torque transferred from the input shaft I through engagement of the third clutch C3, and the rotational speed of the second sun gear S2 (fourth rotary element E4), which is configured to receive torque transferred from the input shaft I through engagement of the first clutch C1. Accordingly, the first shift speed, which is used as a forward shift speed with a high speed ratio with which a positive rotational speed is transferred to the output shaft O, can be established through engagement of the first clutch C1 and engagement of the second brake B2, and the first reverse shift speed, which is used as a reverse shift speed with which a negative rotational speed is transferred to the output shaft O, can be established through engagement of the third clutch C3 and engagement of the second brake B2. Thus, with the second brake B2 serving as the slip engagement element, the slip engagement element can be used commonly for the forward start shift speed and the reverse start shift speed.

3. Configuration of Shift Control Apparatus

The speed change device 1 includes the shift control apparatus 31 which controls the speed change device 1. The hybrid vehicle includes the power control apparatus 32 which controls the engine E, the rotary electric machine MG, and the engine separation clutch L. The shift control apparatus 31 and the power control apparatus 32 are configured to exchange information between each other for coordinated control. The control apparatuses will be described below.

3-1. Power Control Apparatus

The power control apparatus 32 includes an engine control section 33, a rotary electric machine control section 34, an engine separation clutch control section 35, and an integration control section 36 that integrally controls the control sections. The engine control section 33, the rotary electric machine control section 34, the engine separation clutch control section 35, and the integration control section 36 are configured to exchange information among each other.

3-1-1. Integration Control Section

The integration control section 36 is a functional section that performs integration control by calculating target output torque, which is a target drive force to be transferred to the input shaft I, in accordance with the accelerator operation amount, the vehicle speed, the charge amount of the battery, and so forth, determining the drive mode of the engine E and the rotary electric machine MG, calculating engine target output torque, rotary electric machine target output torque, and a target transfer torque capacity of the engine separation clutch, and providing the control sections 33 to 35 with commands corresponding to the calculated values.

The integration control section 36 is configured to transfer, to the shift control apparatus 31, the target output torque, the engine target output torque and the rotary electric machine target output torque, commands for which are given to the drive force source, and drive force source output torque transferred to the input shaft I and estimated on the basis of the target output torque.

The integration control section 36 calculates the drive mode of the drive force source on the basis of the accelerator operation amount, the vehicle speed, the charge amount of the battery, and so forth. Here, the charge amount of the battery is detected by a battery state detection sensor. In the present embodiment, examples of the drive mode that are switchable between each other include an electric drive mode in which only the rotary electric machine MG is used as the drive force source, a parallel mode in which at least the engine E is used as the drive force source, an engine electric power generation mode in which the rotary electric machine MG performs regenerative power generation using a rotational drive force of the engine E, a regenerative electric power generation mode in which the rotary electric machine MG performs regenerative power generation using a rotational drive force transferred from the wheels, and an engine start mode in which the engine E is started using a rotational drive force of the rotary electric machine MG.

Here, a drive force is produced through combustion in the engine E in drive modes including the parallel mode, the engine electric power generation mode, and the engine start mode. Accordingly, in the parallel mode, the engine electric power generation mode, and the engine start mode, the engine E is driven at a predetermined lower limit rotational speed or more for stable combustion of the engine E. In the engine electric power generation mode, in addition, the engine E is driven at an electric power generation rotational speed, which is a rotational speed that is equal to or more than the lower limit rotational speed, in order to increase the generated electric power or enhance the electric power generation efficiency of the rotary electric machine MG. In the present embodiment, the parallel mode, the engine electric power generation mode, and the engine start mode are relevant to the slip travel mode executed in the speed change mechanism to be discussed later. That is, the slip travel mode is executed to cause the slip engagement element of the speed change mechanism TM to slip so that the engine E is driven at a rotational speed that is equal to or more than the predetermined lower limit rotational speed or the electric power generation rotational speed.

3-1-2. Engine Control Section

The engine control section 33 is a functional section that controls an operation of the engine E. In the present embodiment, the engine control section 33 sets a torque command value to the engine target output torque according to the command from the integration control section 36, and controls combustion of the engine E such that the engine E outputs torque corresponding to the torque command value.

In the case where the drive mode is the parallel mode and the engine target output torque is zero, the engine control section 33 performs idling rotational speed feedback control in which output torque of the engine E is increased and decreased to maintain the rotational speed of the engine E at a predetermined target rotational speed.

3-1-3. Rotary Electric Machine Control Section

The rotary electric machine control section 34 is a functional section that controls an operation of the rotary electric machine MG The rotary electric machine control section 34 sets a torque command value to the rotary electric machine target output torque according to the command from the integration control section 36, and controls the rotary electric machine MG such that the rotary electric machine MG outputs torque corresponding to the torque command value. During regenerative electric power generation in the engine electric power generation mode and the regenerative electric power generation mode, the rotary electric machine target output torque is set to a negative value. This allows the rotary electric machine MG to generate electric power by outputting regenerative torque in the negative direction while rotating in the positive direction.

3-1-4. Engine Separation Clutch Control Section

The engine separation clutch control section 35 is a functional section that controls the engine separation clutch L. Here, the engine separation clutch control section 35 controls engagement and disengagement of the engine separation clutch L by controlling the engagement pressure of the engine separation clutch L on the basis of the target transfer torque capacity according to the command from the integration control section 36. In the present embodiment, the engine separation clutch L is basically controlled to the direct-coupling engagement state in which there is no slipping.

3-2. Shift Control Apparatus

Next, the configuration of the shift control apparatus 31 according to the present embodiment will be described. As shown in FIG. 4, the shift control apparatus 31 functions as a core member that controls an operation of the speed change device 1. The shift control apparatus 31 includes an arithmetic processing unit such as a CPU serving as a core member, a storage device such as a RAM (random access memory) configured to read and write data from and into the arithmetic processing unit and a ROM (read only memory) configured to read data from the arithmetic processing unit, and so forth (not shown). Various functional sections 40 to 42 of the shift control apparatus 31 are formed by software (a program) stored in the ROM or the like, hardware such as a separately provided arithmetic circuit, or a combination of both.

The speed change device 1 includes sensors Se1 to Se4 that output an electrical signal to be input to the shift control apparatus 31. The shift control apparatus 31 calculates information detected by the various sensors on the basis of the input electrical signal.

An input shaft rotational speed sensor Se I is a sensor that detects the rotational speed of the input shaft I. The shift control apparatus 31 detects the rotational speed of the input shaft I on the basis of the signal input from the input shaft rotational speed sensor Se1. An output shaft rotational speed sensor Se2 is a sensor that detects the rotational speed of the output shaft O. The shift control apparatus 31 detects the rotational speed of the output shaft O on the basis of the signal input from the output shaft rotational speed sensor Se2. The rotational speed of the output shaft O is proportional to the vehicle speed. Therefore, the shift control apparatus 31 calculates the vehicle speed on the basis of the signal input from the output shaft rotational speed sensor Se2.

An accelerator operation amount sensor Se3 is a sensor that detects the amount of operation of an accelerator pedal operated by a driver to detect the accelerator operation amount. The shift control apparatus 31 detects the acceleration operation amount on the basis of the signal input from the acceleration operation amount sensor Se3. A shift position sensor Se4 is a sensor that detects the selected position (shift position) of a shift lever. The shift control apparatus 31 detects which of ranges is designated by the driver on the basis of information input from the shift position sensor Se4. Here, examples of the ranges include forward travel ranges such as a "drive range", a "second range", and a "low range", reverse travel ranges such as a "reverse range", and non-travel ranges such as a "neutral range" and a "parking range".

As shown in FIG. 2, the shift control apparatus 31 includes a speed change control section 40, and a travel mode selection section 41 and a slip control section 42 that are subordinate to the speed change control section 40.

3-2-1. Speed Change Control Section

The speed change control section 40 is a functional section that performs speed change control in which a shift speed is established in the speed change mechanism TM. The speed change control section 40 determines a target shift speed for the speed change mechanism TM on the basis of information detected by the sensors such as the vehicle speed, the acceleration operation amount, and the shift position. Then, the speed change control section 40 determines friction engagement elements for establishment of the target shift speed on the basis of the operation table shown in FIG. 2 or the like. Then, the speed change control section 40 controls the friction engagement elements for establishment of the target shift speed to the engaged state and controls friction engagement elements not for establishment of the target shift speed to the disengaged state to establish the target shift speed in the speed change mechanism TM. In the case where it is determined that none of the shift speeds is to be established, the speed change control section 40 controls all of the friction engagement elements B1, C1, . . . to the disengaged state.

In the present embodiment, in the case where a travel range is selected, the speed change control section 40 references a speed change map set for each travel range to determine the target shift speed. The speed change map is a map defining the relationship between the accelerator operation amount and the vehicle speed, and the target shift speed for the speed change mechanism TM. The speed change control section 40 controls a hydraulic pressure command for the plurality of friction engagement elements C1, B1, . . . in accordance with the determined target shift speed to establish a shift speed in the speed change mechanism TM. Specifically, the speed change control section 40 provides a hydraulic pressure control device PC with a command for a target hydraulic pressure (command pressure) for the friction engagement elements, and the hydraulic pressure control device PC supplies the friction engagement elements with the target hydraulic pressure (command pressure) according to the command.

In the case where normal shift speed switching control is to be performed, the speed change control section 40 controls the hydraulic pressure command for the friction engagement elements B1, C1, . . . in accordance with a preprogrammed speed change control sequence to engage and disengage the friction engagement elements to switch the shift speed established in the speed change mechanism TM to the target shift speed. In this event, the friction engagement element to be engaged or disengaged is temporarily brought into the slipping engagement state. Such slipping engagement occurs within the period of the preprogrammed speed change control sequence, which is relatively short compared to slipping engagement that occurs in slip control.

In the case where the slip travel mode is selected as the travel mode, on the other hand, the speed change control section 40 performs slip control in which a slip engagement element, which is one of the friction engagement elements for establishment of a shift speed, is controlled to the slipping engagement state in which there is slipping between input and output members of the slip engagement element. A case where the slip control is performed will be described below.

3-2-2. Travel Mode Selection Section

The travel mode selection section 41 is a functional section that selects a travel mode in accordance with various drive conditions. In the present embodiment, the travel mode selection section 41 selects one of the slip travel mode and the direct-coupling travel mode on the basis of the operating state of the engine E, the rotational speed of the output shaft O (vehicle speed), and the target shift speed. That is, a case where all of the friction engagement elements for establishment of the target shift speed are brought into the direct-coupling engagement state is assumed in each drive mode in which a drive force is produced through combustion in the engine E. Then, the travel mode selection section 41 selects the slip travel mode in the case where it is determined that the rotational speed of the engine E is less than a predetermined determination rotational speed required for stable combustion of the engine E or electric power generation, and selects the direct-coupling travel mode in the case where it is determined that the rotational speed of the engine E is the predetermined determination rotational speed or more. In each drive mode in which a drive force is not produced through combustion in the engine E, the travel mode selection section 41 selects the direct-coupling travel mode. Here, the slip travel mode is a travel mode in which the vehicle is run while transferring torque from the input shaft I to the output shaft O with one of the friction engagement elements for establishment of a shift speed engaged with slipping (slipping engagement state), and the direct-coupling travel mode is a normal travel mode in which the vehicle is run while transferring torque from the input shaft I to the output shaft O with all of the friction engagement elements for establishment of a shift speed engaged without slipping (direct-coupling engagement state).

More specifically, the travel mode selection section 41 calculates a direct-coupling input rotational speed, which is the rotational speed of the input shaft I based on the assumption that all of the friction engagement elements for establishment of the target shift speed are brought into the direct-coupling engagement state, as a rotational speed obtained by multiplying the actually detected rotational speed of the output shaft O by the speed ratio of the target shift speed. Then, in the case where the drive mode of the drive force source is the parallel mode or the engine start mode, the travel mode selection section 41 sets the determination rotational speed to a lower limit rotational speed (for example, 600 rpm) required for stable combustion. Then, the travel mode selection section 41 selects the slip travel mode in the case where the direct-coupling input rotational speed is less than the lower limit rotational speed, and selects the direct-coupling travel mode in the case where the direct-coupling input rotational speed is the lower limit rotational speed or more. In the case where the drive mode of the drive force source is the engine electric power generation mode, the travel mode selection section 41 sets the determination rotational speed to the electric power generation rotational speed (for example, 1000 rpm) required for electric power generation. Then, the travel mode selection section 41 selects the slip travel mode in the case where the direct-coupling input rotational speed is less than the electric power generation rotational speed, and selects the direct-coupling travel mode in the case where the direct-coupling input rotational speed is the electric power generation rotational speed or more. In the case where the drive mode of the drive force source is the electric drive mode or the regenerative electric power generation mode, the travel mode selection section 41 selects the direct-coupling travel mode. The electric power generation rotational speed is set to a rotational speed that is at least the lower limit rotational speed or more. The electric power generation rotational speed may be set to coincide with the lower limit rotational speed. In the present embodiment, the engine separation clutch L is brought into the direct-coupling engagement state, and the output rotary shaft of the engine E is drivably coupled to the input shaft I so as to rotate together with the input shaft I. Accordingly, the rotational speed of the engine E is generally equal to the rotational speed of the input shaft I. Therefore, the rotational speed of the engine E may be used in place of the rotational speed of the input shaft I.

At least in the case where the rotational speed of the output shaft O (vehicle speed) is around zero, the direct-coupling input rotational speed, which is calculated by multiplying the rotational speed of the output shaft O by the speed ratio of each shift speed, is around zero, and less than the determination rotational speed. In the present embodiment, as described above, the target shift speed is determined in accordance with the vehicle speed (rotational speed of the output shaft O). In the case where the vehicle speed (rotational speed of the output shaft O) is around zero and a forward travel range is selected, the target shift speed is determined to be the first shift speed. Accordingly, the first shift speed is used as the forward start shift speed to be used for forward start. In the case where the vehicle speed (rotational speed of the output shaft O) is around zero and a reverse travel range is selected, meanwhile, the target shift speed is determined to be the first reverse shift speed. Accordingly, the first reverse shift speed is used as the reverse start shift speed to be used for reverse start. In the case where the vehicle speed increases from around zero and the direct-coupling input rotational speed becomes the lower limit rotational speed or more, the travel mode selection section 41 selects the direct-coupling travel mode in place of the slip travel mode even if the target shift speed is the first shift speed or the first reverse shift speed.

Accordingly, in the present embodiment, with the vehicle speed (rotational speed of the output shaft O) around zero and with the first shift speed or the first reverse shift speed determined as the target shift speed, the direct-coupling input rotational speed may be less than the determination rotational speed, and the slip travel mode may be selected. In the present embodiment, each of the second shift speed to the eighth shift speed and the second reverse shift speed is determined as the target shift speed at such a vehicle speed (rotational speed of the output shaft O) that the direct-coupling input rotational speed with establishment of that shift speed is not less than the determination rotational speed. Thus, the slip travel mode is not selected at each of the second shift speed to the eighth shift speed and the second reverse shift speed.

3-2-3. Slip Control Section

In the case where the slip travel mode is selected, the slip control section 42 performs the slip control in which the slip engagement element, which is one of the friction engagement elements for establishment of a shift speed, is controlled to the slipping engagement state, in which there is slipping between input and output members of the slip engagement element.

The slip control section 42 determines as the slip engagement element a friction engagement element to be engaged commonly for establishment of at least the forward start shift speed, which is one of the shift speeds to be used for forward start, and the reverse start shift speed, which is one of the shift speeds to be used for reverse start. In the present embodiment, the slip control section 42 determines as the slip engagement element the second brake B2 which is to be engaged commonly for establishment of the first shift speed, which is a shift speed to be used for forward start, and the first reverse shift speed or the second reverse shift speed, which is a shift speed to be used for reverse start. A direct-coupling engagement element, which is the other of the friction engagement elements for establishment of a shift speed that is not the slip engagement element, is controlled to the direct-coupling engagement state, in which there is no slipping between input and output members of the direct-coupling engagement element. In the present embodiment, in the case where the target shift speed is the first shift speed, the first clutch C1 is determined as the direct-coupling engagement element. In the case where the target shift speed is the first reverse shift speed, the third clutch C3 is determined as the direct-coupling engagement element. In the case where the target shift speed is the second reverse shift speed, the fourth clutch C4 is determined as the direct-coupling engagement element.

In the present embodiment, the slip control section 42 controls the slip engagement element to the slipping engagement state such that the magnitude of speed change mechanism transfer torque, which is torque transferred from the input shaft I to the side of the wheels, is restricted with respect to the magnitude of drive force source output torque, which is torque transferred from the drive force source to the input shaft I, such that the rotational speed of the input shaft I does not fall below the lower limit rotational speed required for stable combustion of the engine E or the electric power generation rotational speed required for electric power generation. That is, the slip control section 42 controls the slip engagement element to the slipping engagement state such that the magnitude of the speed change mechanism transfer torque transferred from the input shaft I to the side of the wheels is restricted to around the magnitude of the drive force source output torque transferred from the drive force source to the input shaft I. Consequently, the magnitude of the speed change mechanism transfer torque and the magnitude of the drive force source output torque are balanced against each other. Thus, the total torque acting on the input shaft I (input shaft acting torque) is constantly around zero, which makes it possible to stabilize the rotational speed of the input shaft I (engine E). This prevents the rotational speed of the input shaft I from falling below the lower limit rotational speed required for stable combustion or the electric power generation rotational speed required for electric power generation. Besides, torque around the drive force source output torque is transferred from the input shaft I to the side of the wheels. Thus, acceleration and deceleration of the vehicle can be controlled by controlling the drive force source output torque.

More specifically, in the present embodiment, the slip control section 42 controls the hydraulic pressure command for the slip engagement element on the basis of the drive force source output torque. That is, the slip control section 42 calculates input member acting torque, which is a portion of the drive force source output torque transferred to the input shaft I acting on the input member of the slip engagement element via the gear devices and the friction engagement elements of the speed change mechanism TM, on the basis of the drive force source output torque and the tooth number ratios of the gear devices. Then, the slip control section 42 calculates on the basis of the input member acting torque a target hydraulic pressure (hydraulic pressure command) for the slip engagement element that achieves a transfer torque capacity corresponding to the magnitude of the input member acting torque. Then, the speed change control section 40 provides the hydraulic pressure control device PC with a command for the target hydraulic pressure (hydraulic pressure command) for the slip engagement element, and the hydraulic pressure control device PC supplies the slip engagement element with the target hydraulic pressure (command pressure) according to the command. This allows the slip engagement element to work to transfer the acting drive force source output torque on the slip engagement element to the output shaft O. Accordingly, as in the case where all of the friction engagement elements for establishment of a shift speed are in the direct-coupling engagement state, the speed change mechanism TM can transfer to the output shaft O torque with a magnitude corresponding to torque obtained by multiplying the drive force source output torque by the speed ratio of the shift speed.

In the case where the idling rotational speed feedback control is performed for the engine E, the slip control section 42 sets the target hydraulic pressure (hydraulic pressure command) for the slip engagement element to a predetermined pressure to cause the slip engagement element to produce a predetermined transfer torque capacity. Consequently, predetermined torque corresponding to the transfer torque capacity is produced on the input member of the slip engagement element, and predetermined negative torque acts on the input shaft I as a reaction. In order to cancel such negative torque, output torque of the engine E is increased through the idling rotational speed feedback control. This allows the speed change mechanism TM to transfer to the output shaft O torque corresponding to the transfer torque capacity produced by the slip engagement element, which allows the vehicle to creep.

In the present embodiment, the slip control section 42 is configured to perform feedback control in which the hydraulic pressure command for the slip engagement element calculated on the basis of the drive force source output torque is increased and decreased such that the rotational speed of the input shaft I does not fall below the lower limit rotational speed or the electric power generation rotational speed. That is, in the case where the rotational speed of the input shaft I falls below the lower limit rotational speed or the electric power generation rotational speed, the slip control section 42 decreases the hydraulic pressure command for the slip engagement element calculated on the basis of the drive force source output torque. Consequently, the magnitude of the speed change mechanism transfer torque is reduced, which increases the total torque acting on the input shaft I to increase the rotational speed of the input shaft I.

In the case where the direct-coupling travel mode is selected in place of the slip travel mode as a result of an increase in magnitude of the vehicle speed, the slip control section 42 controls the slip engagement element to the direct-coupling engagement state to terminate the slip control.

3-2-4. Starting in Slip Travel Mode

Figure 5:
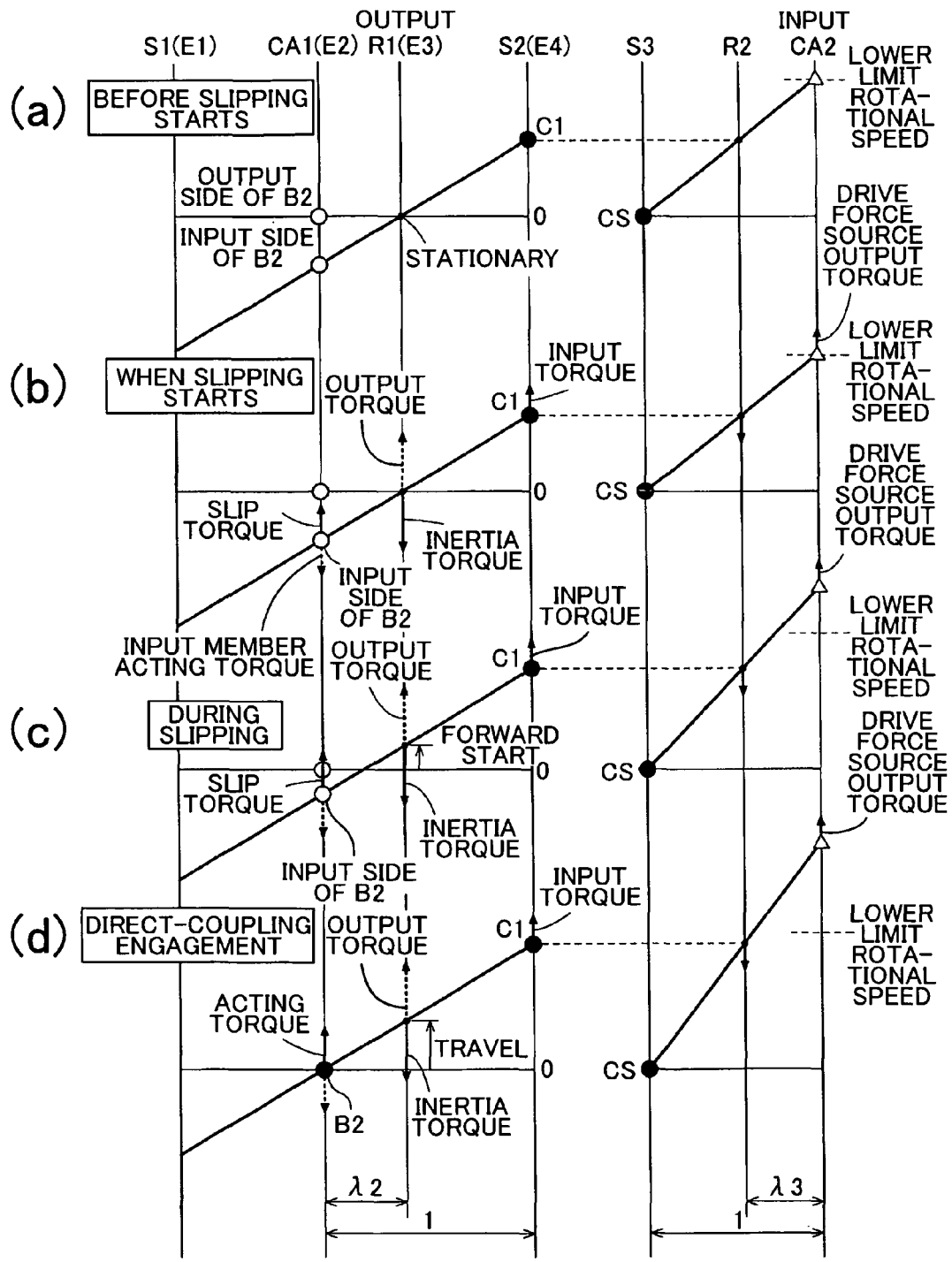
FIG. 5 is a velocity diagram illustrating a process performed by the shift control apparatus according to the first embodiment of the present invention.

Next, an exemplary case where the vehicle is started with the slip engagement element for the forward start shift speed (first shift speed) subjected to the slip control in the parallel mode and the slip travel mode will be described with reference to FIG. 5. FIG. 5 is a velocity diagram for the first shift speed, on which torque acting on each rotary element of each differential gear device is shown in an overlapping manner.

(a) of FIG. 5 shows a state before the slip engagement element is brought into the slip engagement state. In the example of (a) of FIG. 5, the vehicle is stationary with no torque output from the drive force source to the input shaft I with no combustion occurring in the engine E. In addition, a change is made from a non-travel range to a forward travel range, and the first shift speed is determined as the target shift speed. The travel mode selection section 41 selects the slip travel mode because the direct-coupling input rotational speed for the first shift speed is less than the lower limit rotational speed. In (a) of FIG. 5, the first clutch C1 serving as the direct-coupling engagement element is already controlled to the direct-coupling engagement state, and the second brake B2 serving as the slip engagement element is not controlled to the slip engagement state. In FIG. 5, the symbol "●" indicates that the friction engagement element is in the direct-coupling engagement state, and the symbol "○" indicates that there is a difference in rotational speed between the input member and the output member of the friction engagement element and that the friction engagement element is in the slipping engagement state or the disengaged state.

Figure 6:
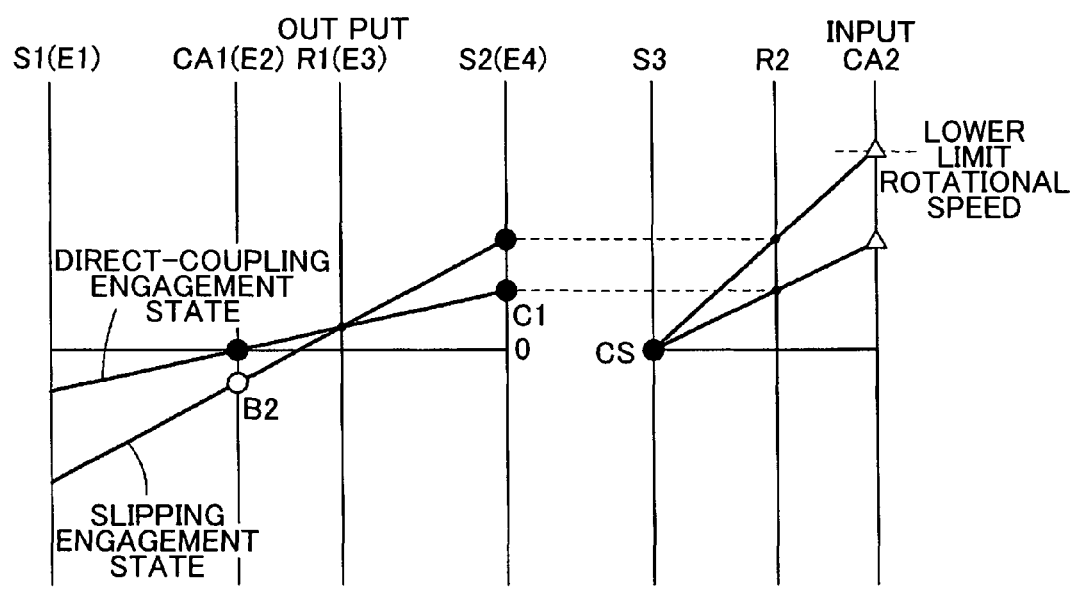
FIG. 6 is a velocity diagram illustrating the process performed by the shift control apparatus according to the first embodiment of the present invention.

As shown in FIG. 6, in the case where the vehicle speed is around zero and the direct-coupling input rotational speed for the first shift speed is less than the lower limit rotational speed, and where the slip engagement element is controlled to the direct-coupling engagement state in addition to the direct-coupling engagement element, the rotational speed of the input shaft I (engine E) falls below the lower limit rotational speed. Here, the inertia of the rotary members rotating together with the input shaft I is sufficiently smaller than the inertia of the vehicle acting via the wheels, and the rotational speed of the input shaft I is significantly reduced before the rotational speed of the output shaft O (vehicle speed) is sufficiently increased. In this state, combustion in the engine E becomes unstable to cause torque variations, and such torque variations are transferred to the side of the wheels since the friction engagement elements for establishment of the shift speed are in the direct-coupling engagement state. By performing the slip control, however, it is possible to prevent the rotational speed of the input shaft I (engine E) from falling below the lower limit rotational speed, and to suppress generation of torque variations.

(b) of FIG. 5 shows a state in which the slip control in which the slip engagement element is brought into the slip engagement state has been started. Positive drive force source output torque is transferred from the drive force source to the input shaft I. The slip control section 42 controls the hydraulic pressure command for the slip engagement element on the basis of the drive force source output torque. Therefore, torque (slip torque) produced by the transfer torque capacity of the slip engagement element is balanced against the input member acting torque which is a portion of the drive force source output torque acting on the input member of the slip engagement element. Consequently, the rotational speed of the input shaft I is maintained so as not to fall below the lower limit rotational speed, and the slip engagement element is constantly maintained in the slipping engagement state, rather than being brought into the direct-coupling engagement state as a result of a rapid decrease in difference in rotational speed between the input and output members of the slip engagement element. Because of the balanced torque relationship, the speed change mechanism TM can transfer to the output shaft O torque obtained by multiplying the drive force source output torque by the speed ratio of a shift speed, as in the direct-coupling travel mode in which all of the friction engagement elements for establishment of the shift speed are brought into the direct-coupling engagement state.

(c) of FIG. 5 shows a state in which the vehicle has accelerated using torque transferred from the speed change mechanism TM to the output shaft O so that the vehicle speed has slightly increased from zero. Even in the case where the vehicle speed has increased, the torque relationship remains balanced through the slip control. Thus, the rotational speed of the input shaft I is maintained so as not to fall below the lower limit rotational speed, and the slip engagement element is maintained in the slip engagement state. Here, the rotational speed of each rotary element has increased along with the increase in vehicle speed. Since the torque relationship is balanced through the slip control, torque corresponding to the drive force source output torque can be transferred to the output shaft O as in the direct-coupling travel mode.

In the slip travel mode, the vehicle is run while transferring torque from the input shaft I to the output shaft O with the slip engagement element caused to slip. Therefore, the slip engagement element may be slipping over a long period, depending on the running state of the vehicle, compared to a case where switching between shift speeds is executed in a planned manner over a predetermined period. In the case where the slip travel mode is executed when the vehicle starts to travel forward or backward, in particular, the moment of inertia of the vehicle is large. Therefore, the slip travel mode tends to be executed over a long period, since the vehicle starts to travel from a stationary state until the vehicle speed increases. The slip travel mode may also be executed over a long period when the vehicle continuously travels at a low speed at which the direct-coupling input rotational speed falls below the lower limit rotational speed after start or during travel. The slip travel mode may also be executed over a long period when the vehicle travels at a low speed while the rotary electric machine MG is generating electric power using the drive force of the engine E in the engine electric power generation mode. The slip travel mode may also be executed over a long period when the engine start mode is executed during start or during travel, until the engine E is completely started, for example. When the slip travel mode is executed on such occasions, the difference in rotational speed between the input and output members of the slip engagement element is large. Therefore, the slip engagement element which is caused to slip in the slip travel mode on such occasions may produce a large amount of frictional heat. Thus, it is necessary to enhance the cooling capability and the heat-resistant performance against frictional heat for the slip engagement element, which is caused to slip in the slip travel mode, compared to other friction engagement elements.

(d) of FIG. 5 shows a state in which the vehicle speed has further increased and the direct-coupling input rotational speed has become the lower limit rotational speed or more so that the direct-coupling travel mode is selected in place of the slip travel mode. The slip control section 42 controls the slip engagement element to the direct-coupling engagement state to terminate the slip control. In this case, the rotational speed of the input shaft I does not fall below the lower limit rotational speed even when the slip engagement element is brought into the direct-coupling engagement state.

Figure 7:
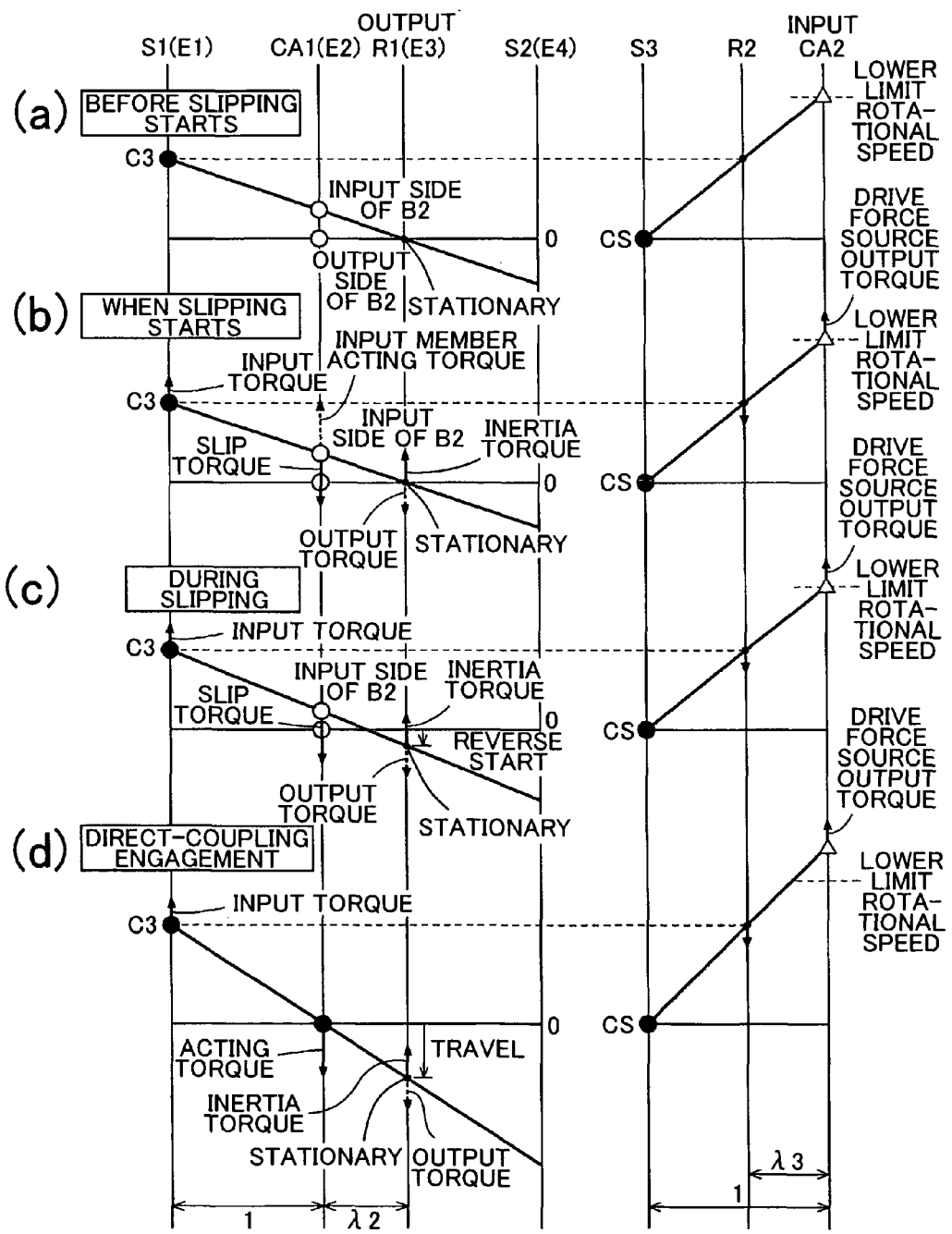
FIG. 7 is a velocity diagram illustrating the process performed by the shift control apparatus according to the first embodiment of the present invention.

Next, an instance of a case where the vehicle is started with the slip engagement element for the reverse start shift speed (first reverse shift speed) subjected to the slip control in the parallel mode and the slip travel mode will be described with reference to FIG. 7. FIG. 7 is a velocity diagram for the first reverse shift speed, on which torque acting on each rotary element of each differential gear device is shown in an overlapping manner.

(a) of FIG. 7 shows a state before the slip engagement element is brought into the slip engagement state as with (a) of FIG. 5. In (a) of FIG. 7, a change is made from a non-travel range to a reverse travel range, and the first reverse shift speed is determined as the target shift speed. The travel mode selection section 41 selects the slip travel mode because the direct-coupling input rotational speed for the first reverse shift speed is less than the lower limit rotational speed.

(b) of FIG. 7 shows a state in which the slip control in which the slip engagement element is brought into the slip engagement state has been started as with (b) of FIG. 5. Positive drive force source output torque is transferred from the drive force source to the input shaft I. The slip control section 42 controls the hydraulic pressure command for the slip engagement element on the basis of the drive force source output torque. Therefore, torque (slip torque) produced by the transfer torque capacity of the slip engagement element is balanced against the input member acting torque which is a portion of the drive force source output torque acting on the input member of the slip engagement element. Consequently, the rotational speed of the input shaft I is maintained so as not to fall below the lower limit rotational speed, and the slip engagement element is maintained in the slip engagement state. Since the torque relationship is balanced through the slip control, torque corresponding to the drive force source output torque can be transferred to the output shaft O as in the direct-coupling travel mode.

(c) of FIG. 7 shows a state in which the vehicle has accelerated in the negative direction using torque transferred from the speed change mechanism TM to the output shaft O so that the magnitude of the vehicle speed has slightly increased from zero. Even in the case where the vehicle speed has decreased, the torque relationship remains balanced through the slip control. Thus, the rotational speed of the input shaft I is maintained so as not to fall below the lower limit rotational speed, and the slip engagement element is maintained in the slip engagement state. Here, the rotational speed of each rotary element decreases as the vehicle speed decreases. However, the slip control section 42 decreases the hydraulic pressure command for the slip engagement element so that the rotational speed of the input shaft I does not fall below the lower limit rotational speed or the electric power generation rotational speed. Since the torque relationship is balanced through the slip control, torque corresponding to the drive force source output torque can be transferred to the output shaft O as in the direct-coupling travel mode.

(d) of FIG. 7 shows a state in which the magnitude of the vehicle speed has further increased and the direct-coupling input rotational speed has become the lower limit rotational speed or more so that the direct-coupling travel mode is selected in place of the slip travel mode. The slip control section 42 controls the slip engagement element to the direct-coupling engagement state to terminate the slip control. In this case, the rotational speed of the input shaft I does not fall below the lower limit rotational speed even when the slip engagement element is brought into the direct-coupling engagement state.

[Second Embodiment]

Next, a second embodiment of the present invention will be described. In the first embodiment described above, the speed change mechanism TM is provided with eight forward shift speeds and two reverse shift speeds. In the present embodiment, however, the speed change mechanism TM is configured differently, and provided with six forward shift speeds and one reverse shift speed. Otherwise, the present embodiment may be the same as the first embodiment. Thus, differences from the first embodiment described above will be described below.

Figure 8:
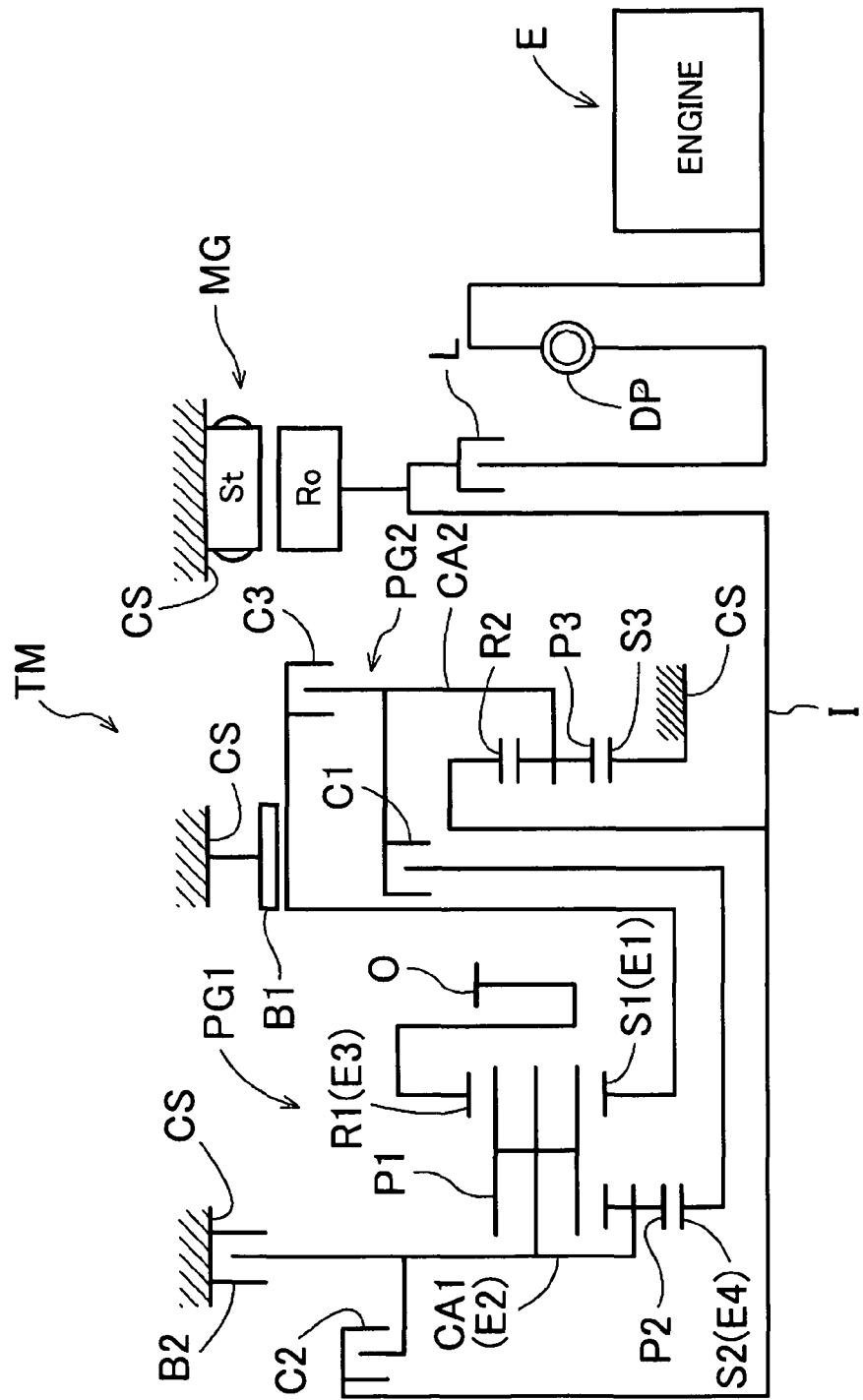
FIG. 8 is a skeleton diagram of a speed change device according to a second embodiment of the present invention.

As shown in FIG. 8, the speed change mechanism TM according to the present embodiment is formed by assembling two differential gear devices PG1 and PG2 to each other. In addition, the speed change mechanism TM includes, as a plurality of friction engagement elements, a first clutch C1, a second clutch C2, a third clutch C3, a first brake B1, and a second brake B2.

Figures 9, 10:
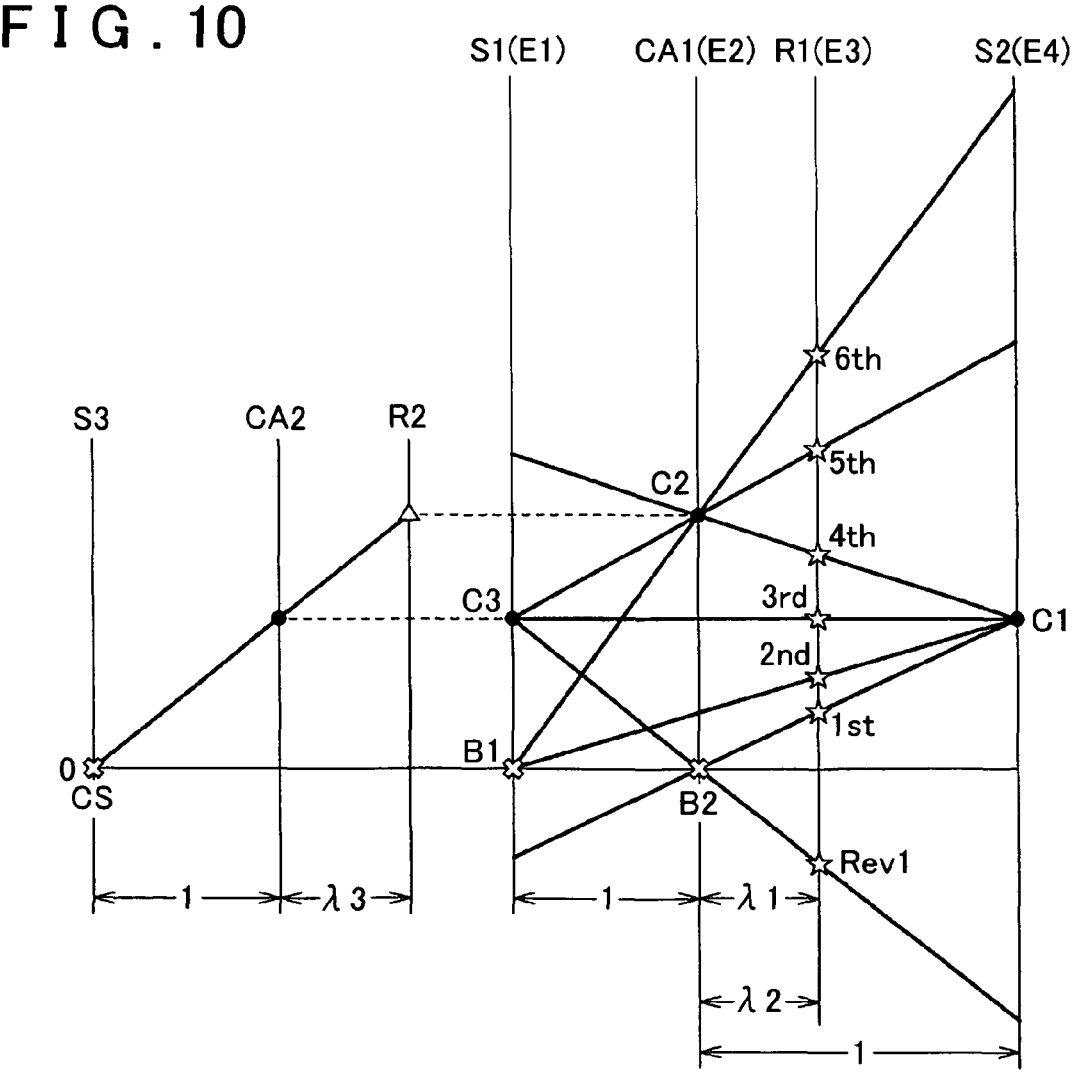
FIG. 9 is an operation table of the speed change device according to the second embodiment of the present invention.
FIG. 10 is a velocity diagram of the speed change device according to the second embodiment of the present invention.

FIG. 9 is an operation table of the friction engagement elements C1, C2, C3, B1, and B2. Also in the speed change mechanism TM according to the present embodiment, as shown in the operation table, each shift speed is selectively established by bringing two of the friction engagement elements into the engaged state and bringing the remaining friction engagement elements into the disengaged state.

In FIG. 9, "1st" indicates a first shift speed, "2nd" indicates a second shift speed, "3rd" indicates a third shift speed, "4th" indicates a fourth shift speed, "5th" indicates a fifth shift speed, "6th" indicates a sixth shift speed, and "Rev1" indicates a first reverse shift speed. In the present embodiment, the forward shift speeds are the first shift speed, the second shift speed, . . . , the sixth shift speed in the descending order of speed ratio with which rotation of the input shaft I is transferred to the output shaft O.

Also in the present embodiment, the first shift speed is used as a forward start shift speed, which is one of the shift speeds to be used for forward start, and the first reverse shift speed is used as a reverse start shift speed, which is one of the shift speeds to be used for reverse start. The second brake B2, which is brought into the engaged state for establishment of the first shift speed, serves as a slip engagement element, which is a friction engagement element that is caused to slip in the slip travel mode for the first shift speed. Meanwhile, the second brake B2, which is brought into the engaged state for establishment of the first reverse shift speed, serves as a slip engagement element, which is a friction engagement element that is caused to slip in the slip travel mode for the first reverse shift speed. Thus, the second brake B2 serving as the slip engagement element serves as a friction engagement element to be engaged commonly for establishment of at least the forward start shift speed and the reverse start shift speed.

Next, returning to FIG. 8, the skeleton diagram of the speed change mechanism TM according to the present embodiment will be described. The second differential gear device PG2 according to the present embodiment is formed by a single-pinion planetary gear mechanism disposed coaxially with the input shaft I, unlike the first embodiment. That is, the second differential gear device PG2 is a differential gear device including three rotary elements, namely a carrier CA2 that supports a plurality of pinion gears P3, a sun gear S3 that meshes with the pinion gears P3, and a ring gear R2 that meshes with the pinion gears P3. The three rotary elements of the second differential gear device PG2 are the sun gear S3, the carrier CA2, and the ring gear R2 in the order of rotational speed.

The ring gear R2 of the second differential gear device PG2 is drivably coupled to the input shaft I so as to rotate together with the input shaft I. A drive force transferred from the drive force source to the input shaft I is transferred to the ring gear R2. The sun gear S3 of the second differential gear device PG2 is fixed to the case CS serving as a non-rotary member. The carrier CA2 of the second differential gear device PG2 is configured to be drivably coupled to a second sun gear S2 of the first differential gear device PG1 through engagement of the first clutch C1, and to be drivably coupled to a first sun gear S1 of the first differential gear device PG1 through engagement of the third clutch C3.

On the other hand, the first differential gear device PG1 is formed by a Ravigneaux planetary gear device disposed coaxially with the input shaft I as in the first embodiment. Also in the present embodiment, the first differential gear device PG1 is a differential gear device including four rotary elements, namely the first sun gear S1, the second sun gear S2, a ring gear R1, and a common carrier CA1 which supports long pinion gears P1 and short pinion gears P2. The four rotary elements of the first differential gear device PG1 are assumed to be a first rotary element E1, a second rotary element E2, a third rotary element E3, and a fourth rotary element E4 in the order of rotational speed. Then, also in the present embodiment, the first sun gear S1 corresponds to the first rotary element E1, the carrier CA1 corresponds to the second rotary element E2, the ring gear R1 corresponds to the third rotary element E3, and the second sun gear S2 corresponds to the fourth rotary element E4.

The first sun gear S1 serving as the first rotary element E1 is configured to receive torque of the drive force source, which has been transferred from the input shaft I to the ring gear R2 via the carrier CA2 of the second differential gear device PG2, through engagement of the third clutch C3. The first sun gear S1 serving as the first rotary element E1 is configured to be fixed to the case CS through engagement of the first brake B1.

The carrier CA1 serving as the second rotary element E2 is configured to receive torque of the drive force source, which has been transferred from the input shaft I, through engagement of the second clutch C2. The carrier CA1 serving as the second rotary element E2 is also configured to be fixed to the case CS through engagement of the second brake B2.

The ring gear R1 serving as the third rotary element E3 is drivably coupled to the output shaft O.

The second sun gear S2 serving as the fourth rotary element E4 is configured to receive torque of the drive force source, which has been transferred from the input shaft I to the ring gear R2 via the carrier CA2 of the second differential gear device PG2, through engagement of the first clutch C1.

The friction engagement elements are selectively engaged on the basis of the operation table shown in FIG. 9 to establish each shift speed. FIG. 10 is a velocity diagram of the speed change mechanism TM according to the present embodiment. As shown in FIGS. 9 and 10, the first shift speed is established through engagement of the first clutch C1 and engagement of the second brake B2. That is, with the first clutch C1 engaged, the rotational drive force of the input shaft I input to the ring gear R2 of the second differential gear device PG2 is reduced in speed on the basis of the tooth number ratio $\lambda 3$ to be transferred to the second sun gear S2 of the first differential gear device PG1. With the second brake B2 engaged, the carrier CA1 of the first differential gear device PG1 is fixed to the case CS. This allows the rotational drive force of the second sun gear S2 to be further reduced in speed on the basis of the tooth number ratio $\lambda 2$ to be transferred to the output shaft O. Also in the present embodiment, the second brake B2, which is brought into the engaged state for establishment of the first shift speed, is brought into the slipping engagement state, in which there is slipping between input and output members of the second brake B2, in the slip travel mode. That is, the second brake B2 serves as the slip engagement element according to the present invention. In the slipping engagement state, the torque relationship and the rotational speed relationship vary in accordance with the amount of slipping. Also in the present embodiment, the first shift speed is used as the forward start shift speed, which is one of the shift speeds to be used for forward start.

The second shift speed is established through engagement of the first clutch C1 and engagement of the first brake B1. That is, with the first clutch C1 engaged, the rotational drive force of the input shaft I input to the ring gear R2 of the second differential gear device PG2 is reduced in speed on the basis of the tooth number ratio $\lambda 3$ to be transferred to the second sun gear S2 of the first differential gear device PG1. With the first brake B1 engaged, the first sun gear S1 of the first differential gear device PG1 is fixed to the case CS. Then, the rotational drive force of the second sun gear S2 is further reduced in speed on the basis of the tooth number ratios $\lambda 1$ and $\lambda 2$ to be transferred to the output shaft O.

The third shift speed is established through engagement of the first clutch C1 and engagement of the third clutch C3. That is, with the first clutch C1 engaged, the rotational drive force of the input shaft I input to the ring gear R2 of the second differential gear device PG2 is reduced in speed on the basis of the tooth number ratio $\lambda 3$ to be transferred to the second sun gear S2 of the first differential gear device PG1. With the third clutch C3 engaged, the rotational drive force of the input shaft I is reduced in speed on the basis of the tooth number ratio $\lambda 3$ to be transferred to the second sun gear S2 of the first differential gear device PG1. Then, with the first sun gear S1 and the second sun gear S2 rotating at the same speed as each other, the rotational drive force of the input shaft I which has been reduced in speed on the basis of the tooth number ratio $\lambda 3$ is transferred as it is to the output shaft O.

The fourth shift speed is established through engagement of the first clutch C1 and engagement of the second clutch C2. That is, with the first clutch C1 engaged, the rotational drive force of the input shaft I input to the ring gear R2 of the second differential gear device PG2 is reduced in speed on the basis of the tooth number ratio $\lambda 3$ to be transferred to the second sun gear S2 of the first differential gear device PG1. With the second clutch C2 engaged, the rotational drive force of the input shaft I is transferred as it is to the carrier CA1 of the first differential gear device PG1. Then, the rotational drive force of the input shaft I, which is determined on the basis of the respective rotational speeds of the carrier CA1 and the second sun gear S2 and the tooth number ratio $\lambda 2$, is transferred to the output shaft O.

The fifth shift speed is established through engagement of the second clutch C2 and engagement of the third clutch C3. That is, with the second clutch C2 engaged, the rotational drive force of the input shaft I is transferred as it is to the carrier CA1 of the first differential gear device PG1. With the third clutch C3 engaged, the rotational drive force of the input shaft I is reduced in speed on the basis of the tooth number ratio $\lambda 3$ to be transferred to the first sun gear S1 of the first differential gear device PG1. Then, the rotational drive force of the input shaft I, which is determined on the basis of the respective rotational speeds of the first sun gear S1 and the carrier CA1 and the tooth number ratio $\lambda 1$, is transferred to the output shaft O.

The sixth shift speed is established through engagement of the second clutch C2 and engagement of the first brake B1. That is, with the second clutch C2 engaged, the rotational drive force of the input shaft I is transferred as it is to the carrier CA1 of the first differential gear device PG1. With the first brake B1 engaged, the first sun gear S1 of the first differential gear device PG1 is fixed to the case CS. Then, the rotational drive force of the input shaft I is increased in speed on the basis of the tooth number ratio $\lambda 1$ to be transferred to the output shaft O.

The first reverse shift speed is established through engagement of the third clutch C3 and engagement of the second brake B2. That is, with the third clutch C3 engaged, the rotational drive force of the input shaft I input to the ring gear R2 of the second differential gear device PG2 is reduced in speed on the basis of the tooth number ratio $\lambda 3$ to be transferred to the first sun gear S1 of the first differential gear device PG1. With the second brake B2 engaged, the carrier CA1 of the first differential gear device PG1 is fixed to the case CS. This allows the rotational drive force of the first sun gear S1 to be reduced in speed on the basis of the tooth number ratio $\lambda 1$ and reversed to be transferred to the output shaft O. Also in the present embodiment, the second brake B2, which is brought into the engaged state for establishment of the first reverse shift speed, is brought into the slipping engagement state, in which there is slipping between input and output members of the second brake B2, in the slip travel mode. That is, the second brake B2 serves as the slip engagement element according to the present invention. In the slipping engagement state, the torque relationship and the rotational speed relationship vary in accordance with the amount of slipping. In the present embodiment, the first reverse shift speed is used as the reverse start shift speed, which is one of the shift speeds to be used for reverse start.

In the case where the slip travel mode is selected as the travel mode, as in the first embodiment, the shift control apparatus 31 according to the present embodiment performs slip control in which a slip engagement element, which is one of the friction engagement elements for establishment of a shift speed, is controlled to the slipping engagement state in which there is slipping between input and output members of the slip engagement element. Also in the present embodiment, with the vehicle speed (rotational speed of the output shaft O) around zero and with the first shift speed or the first reverse shift speed determined as the target shift speed, the direct-coupling input rotational speed may be less than the determination rotational speed, and the slip travel mode may be selected. Also in the present embodiment, the second brake B2, which is a friction engagement element to be engaged commonly for establishment of at least the forward start shift speed, which is one of the shift speeds to be used for forward start, and the reverse start shift speed, which is one of the shift speeds to be used for reverse start, is determined as the slip engagement element.

[Third Embodiment]

Next, a third embodiment of the present invention will be described. In the first embodiment described above, the speed change mechanism TM is provided with eight forward shift speeds and two reverse shift speeds. In the present embodiment, however, the speed change mechanism TM is configured differently, and provided with four forward shift speeds and one reverse shift speed. Otherwise, the present embodiment may be the same as the first embodiment. Thus, differences from the first embodiment described above will be described below.

Figure 11:
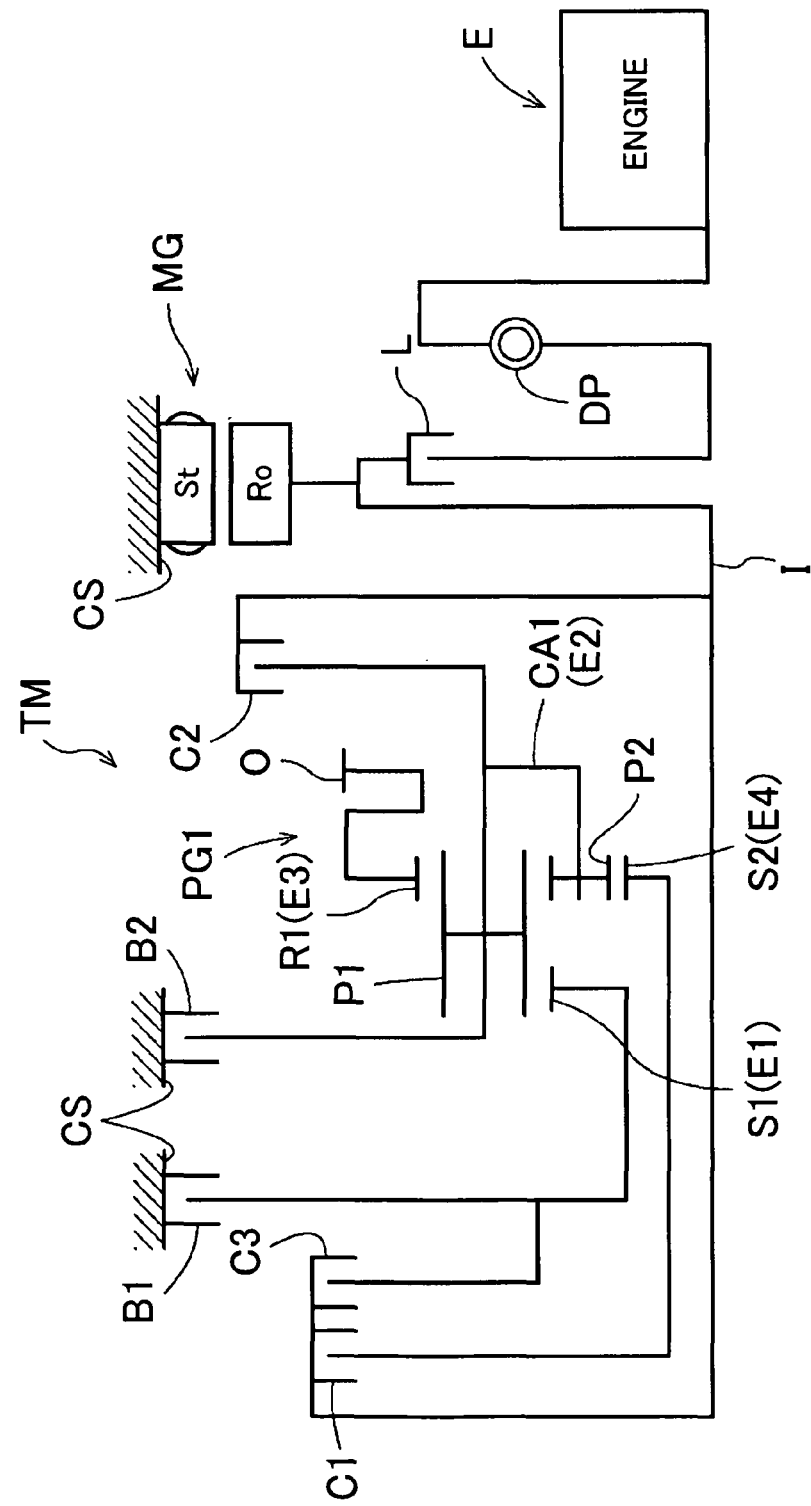
FIG. 11 is a skeleton diagram of a speed change device according to a third embodiment of the present invention.

As shown in FIG. 11, the speed change mechanism TM according to the present embodiment is formed by one differential gear device PG1. In addition, the speed change mechanism TM includes, as a plurality of friction engagement elements, a first clutch C1, a second clutch C2, a third clutch C3, a first brake B1, and a second brake B2.

Figures 12, 13:
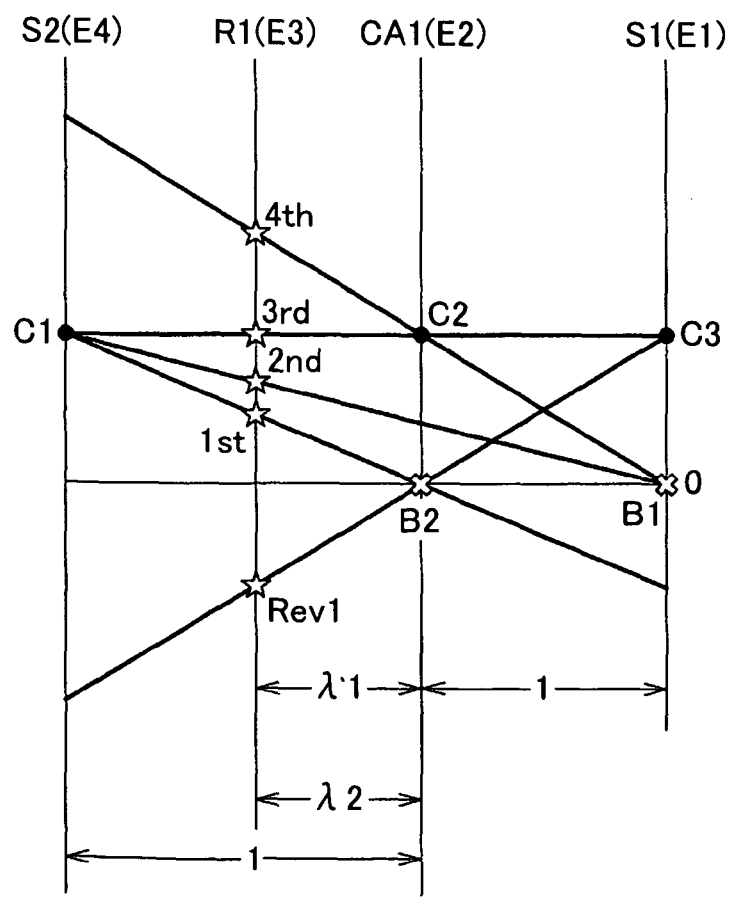
FIG. 12 is an operation table of the speed change device according to the third embodiment of the present invention.
FIG. 13 is a velocity diagram of the speed change device according to the third embodiment of the present invention.

FIG. 12 is an operation table of the friction engagement elements C1, C2, C3, B1, and B2. In the speed change mechanism TM according to the present embodiment, as shown in the operation table, each shift speed is selectively established by bringing two of the friction engagement elements into the engaged state and bringing the remaining friction engagement elements into the disengaged state.

In FIG. 12, "1st" indicates a first shift speed, "2nd" indicates a second shift speed, "3rd" indicates a third shift speed, "4th" indicates a fourth shift speed, and "Rev1" indicates a first reverse shift speed. In the present embodiment, the forward shift speeds are the first shift speed, the second shift speed, . . . , the forth shift speed in the descending order of speed ratio with which rotation of the input shaft I is transferred to the output shaft O.

Also in the present embodiment, the first shift speed is used as a forward start shift speed, which is one of the shift speeds to be used for forward start, and the first reverse shift speed is used as a reverse start shift speed, which is one of the shift speeds to be used for reverse start. The second brake B2, which is brought into the engaged state for establishment of the first shift speed, serves as a slip engagement element, which is a friction engagement element that is caused to slip in the slip travel mode for the first shift speed. Meanwhile, the second brake B2, which is brought into the engaged state for establishment of the first reverse shift speed, serves as a slip engagement element, which is a friction engagement element that is caused to slip in the slip travel mode for the first reverse shift speed. Thus, the second brake B2 serving as the slip engagement element serves as a friction engagement element to be engaged commonly for establishment of at least the forward start shift speed and the reverse start shift speed.

Next, returning to FIG. 11, the skeleton diagram of the speed change mechanism TM according to the present embodiment will be described. The first differential gear device PG1 according to the present embodiment is formed by a Ravigneaux planetary gear device disposed coaxially with the input shaft I as in the first embodiment. Also in the present embodiment, the first differential gear device PG1 is a differential gear device including four rotary elements, namely a first sun gear S1, a second sun gear S2, a ring gear R1, and a common carrier CA1 which supports long pinion gears P1 and short pinion gears P2. The four rotary elements of the first differential gear device PG1 are assumed to be a first rotary element E1, a second rotary element E2, a third rotary element E3, and a fourth rotary element E4 in the order of rotational speed. Then, also in the present embodiment, the first sun gear S1 corresponds to the first rotary element E1, the carrier CA1 corresponds to the second rotary element E2, the ring gear R1 corresponds to the third rotary element E3, and the second sun gear S2 corresponds to the fourth rotary element E4.

In the present embodiment, the first sun gear S1 serving as the first rotary element E1 is configured to receive torque of the drive force source, which has been transferred to the input shaft I, through engagement of the third clutch C3. The first sun gear S1 is also configured to be fixed to the case CS through engagement of the first brake B1.

The carrier CA1 serving as the second rotary element E2 is configured to receive torque of the drive force source, which has been transferred from the input shaft I, through engagement of the second clutch C2. The carrier CA1 serving as the second rotary element E2 is also configured to be fixed to the case CS through engagement of the second brake B2.

The ring gear R1 serving as the third rotary element E3 is drivably coupled to the output shaft O.

The second sun gear S2 serving as the fourth rotary element E4 is configured to receive torque of the drive force source, which has been transferred from the input shaft I, through engagement of the first clutch C1.

The friction engagement elements are selectively engaged on the basis of the operation table shown in FIG. 12 to establish each shift speed. FIG. 13 is a velocity diagram of the speed change mechanism TM according to the present embodiment. As shown in FIGS. 12 and 13, the first shift speed is established through engagement of the first clutch C1 and engagement of the second brake B2. That is, with the first clutch C1 engaged, the rotational drive force of the input shaft I is transferred as it is to the second sun gear S2 of the first differential gear device PG1. With the second brake B2 engaged, the carrier CA1 of the first differential gear device PG1 is fixed to the case CS. Consequently, the rotational drive force of the input shaft I is reduced in speed on the basis of the tooth number ratio $\lambda 2$ to be transferred to the output shaft O. Also in the present embodiment, the second brake B2, which is brought into the engaged state for establishment of the first shift speed, is brought into the slipping engagement state, in which there is slipping between input and output members of the second brake B2, in the slip travel mode. That is, the second brake B2 serves as the slip engagement element according to the present invention. In the slipping engagement state, the torque relationship and the rotational speed relationship vary in accordance with the amount of slipping. Also in the present embodiment, the first shift speed is used as the forward start shift speed, which is one of the shift speeds to be used for forward start.

The second shift speed is established through engagement of the first clutch C1 and engagement of the first brake B1. That is, with the first clutch C1 engaged, the rotational drive force of the input shaft I is transferred as it is to the second sun gear S2 of the first differential gear device PG1. With the first brake B1 engaged, the first sun gear S1 of the first differential gear device PG1 is fixed to the case CS. Then, the rotational drive force of the input shaft I is further reduced in speed on the basis of the tooth number ratios $\lambda 1$ and $\lambda 2$ to be transferred to the output shaft O.

The third shift speed is established through engagement of the first clutch C1 and engagement of the second clutch C2. That is, with the first clutch C1 engaged, the rotational drive force of the input shaft I is transferred as it is to the second sun gear S2 of the first differential gear device PG1. With the second clutch C2 engaged, the rotational drive force of the input shaft I is transferred as it is to the carrier CA1 of the first differential gear device PG1. Then, with the second sun gear S2 and the carrier CA1 rotating at the same speed as each other, the rotational drive force of the input shaft I is transferred as it is to the output shaft O.

The fourth shift speed is established through engagement of the second clutch C2 and engagement of the first brake B1. That is, with the second clutch C2 engaged, the rotational drive force of the input shaft I is transferred as it is to the carrier CA1 of the first differential gear device PG1. With the first brake B1 engaged, the first sun gear S1 of the first differential gear device PG1 is fixed to the case CS. Then, the rotational drive force of the input shaft I is increased in speed on the basis of the tooth number ratio $\lambda 1$ to be transferred to the output shaft O.

The first reverse shift speed is established through engagement of the third clutch C3 and engagement of the second brake B2. That is, with the third clutch C3 engaged, the rotational drive force of the input shaft I is transferred as it is to the first sun gear S1 of the first differential gear device PG1. With the second brake B2 engaged, the carrier CA1 of the first differential gear device PG1 is fixed to the case CS. Consequently, the rotational drive force of the input shaft I is reduced in speed on the basis of the tooth number ratio $\lambda 1$ and reversed to be transferred to the output shaft O. Also in the present embodiment, the second brake B2, which is brought into the engaged state for establishment of the first reverse shift speed, is brought into the slipping engagement state, in which there is slipping between input and output members of the second brake B2, in the slip travel mode. That is, the second brake B2 serves as the slip engagement element according to the present invention. In the slipping engagement state, the torque relationship and the rotational speed relationship vary in accordance with the amount of slipping. In the present embodiment, the first reverse shift speed is used as the reverse start shift speed, which is one of the shift speeds to be used for reverse start.

In the case where the slip travel mode is selected as the travel mode, as in the first embodiment, the shift control apparatus 31 according to the present embodiment performs slip control in which a slip engagement element, which is one of the friction engagement elements for establishment of a shift speed, is controlled to the slipping engagement state in which there is slipping between input and output members of the slip engagement element. Also in the present embodiment, with the vehicle speed (rotational speed of the output shaft O) around zero and with the first shift speed or the first reverse shift speed determined as the target shift speed, the direct-coupling input rotational speed may be less than the determination rotational speed, and the slip travel mode may be selected. Also in the present embodiment, the second brake B2, which is a friction engagement element to be engaged commonly for establishment of at least the forward start shift speed, which is one of the shift speeds to be used for forward start, and the reverse start shift speed, which is one of the shift speeds to be used for reverse start, is determined as the slip engagement element.

[Fourth Embodiment]

Next, a fourth embodiment of the present invention will be described. In the first embodiment described above, the speed change mechanism TM is provided with eight forward shift speeds and two reverse shift speeds. In the fourth embodiment, however, the speed change mechanism TM is configured differently, and provided with six forward shift speeds and two reverse shift speeds. Otherwise, the present embodiment may be the same as the first embodiment. Thus, differences from the first embodiment described above will be described below.

Figure 14:
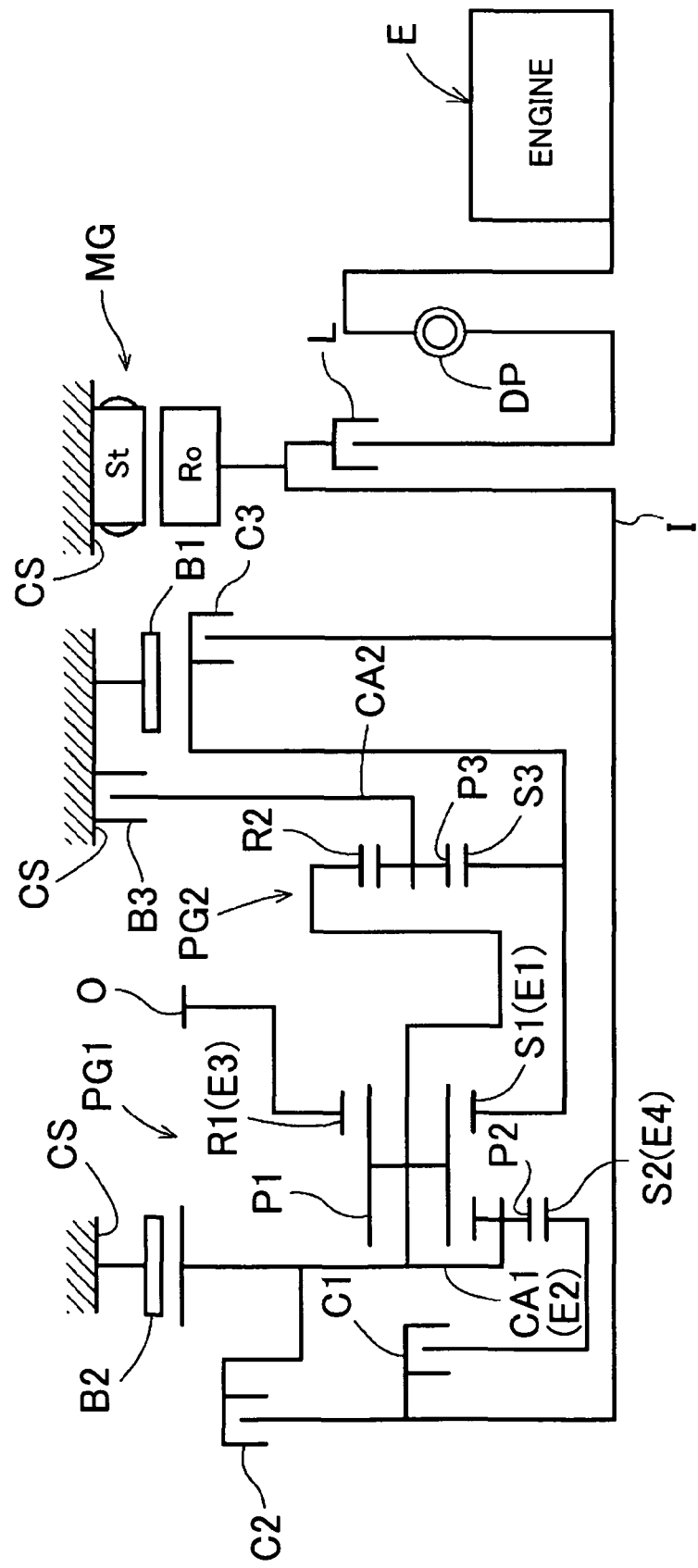
FIG. 14 is a skeleton diagram of a speed change device according to a fourth embodiment of the present invention.

As shown in FIG. 14, the speed change mechanism TM according to the present embodiment is formed by assembling two differential gear devices PG1 and PG2 to each other. In addition, the speed change mechanism TM includes, as a plurality of friction engagement elements, a first clutch C1, a second clutch C2, a third clutch C3, a first brake B1, a second brake B2, and a third brake B3.

Figures 15, 16:
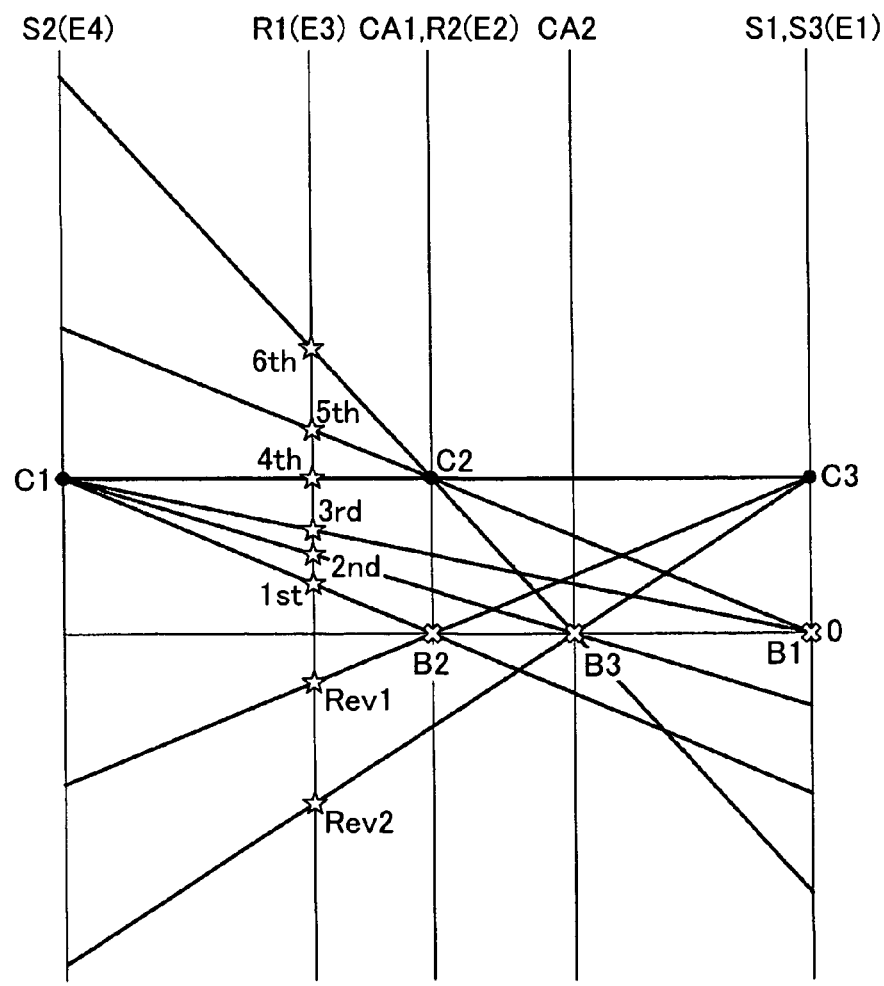
FIG. 15 is an operation table of the speed change device according to the fourth embodiment of the present invention.
FIG. 16 is a velocity diagram of the speed change device according to the fourth embodiment of the present invention.

FIG. 15 is an operation table of the friction engagement elements C1, C2, C3, B1, B2, and B3. In the speed change mechanism TM according to the present embodiment, as shown in the operation table, each shift speed is selectively established by bringing two or more of the friction engagement elements into the engaged state and bringing the remaining friction engagement elements into the disengaged state.

In FIG. 15, "1st" indicates a first shift speed, "2nd" indicates a second shift speed, "3rd" indicates a third shift speed, "4th" indicates a fourth shift speed, "5th" indicates a fifth shift speed, "6th" indicates a sixth shift speed, "Rev1" indicates a first reverse shift speed, and "Rev2" indicates a second reverse shift speed. In the present embodiment, the forward shift speeds are the first shift speed, the second shift speed, . . . , the sixth shift speed in the descending order of speed ratio with which rotation of the input shaft I is transferred to the output shaft O. This also applies to the reverse shift speeds, which are the first reverse shift speed and the second reverse shift speed in the descending order of speed ratio.

Also in the present embodiment, the first shift speed is used as a forward start shift speed, which is one of the shift speeds to be used for forward start, and the first reverse shift speed is used as a reverse start shift speed, which is one of the shift speeds to be used for reverse start. The second brake B2, which is brought into the engaged state for establishment of the first shift speed, serves as a slip engagement element, which is a friction engagement element that is caused to slip in the slip travel mode for the first shift speed. Meanwhile, the second brake B2, which is brought into the engaged state for establishment of the first reverse shift speed, serves as a slip engagement element, which is a friction engagement element that is caused to slip in the slip travel mode for the first reverse shift speed. Thus, the second brake B2 serving as the slip engagement element serves as a friction engagement element to be engaged commonly for establishment of at least the forward start shift speed and the reverse start shift speed.

Next, returning to FIG. 14, the skeleton diagram of the speed change mechanism TM according to the present embodiment will be described. The second differential gear device PG2 according to the present embodiment is formed by a single-pinion planetary gear mechanism disposed coaxially with the input shaft I, unlike the first embodiment. That is, the second differential gear device PG2 is a differential gear device including three rotary elements, namely a carrier CA2 that supports a plurality of pinion gears P3, a sun gear S3 that meshes with the pinion gears P3, and a ring gear R2 that meshes with the pinion gears P3. The three rotary elements of the second differential gear device PG2 are the sun gear S3, the carrier CA2, and the ring gear R2 in the order of rotational speed.

The ring gear R2 of the second differential gear device PG2 is drivably coupled to a carrier CA1 of the first differential gear device PG1 so as to rotate together with the carrier CAL. The sun gear S3 of the second differential gear device PG2 is drivably coupled to a sun gear S1 of the first differential gear device PG1 so as to rotate together with the sun gear S1. The carrier CA2 of the second differential gear device PG2 is configured to be drivably coupled to the case CS serving as a non-rotary member through engagement of the first brake B1.

On the other hand, the first differential gear device PG1 is formed by a Ravigneaux planetary gear device disposed coaxially with the input shaft I as in the first embodiment. Also in the present embodiment, the first differential gear device PG1 is a differential gear device including four rotary elements, namely the first sun gear S1, a second sun gear S2, a ring gear R1, and the common carrier CA1 which supports long pinion gears P1 and short pinion gears P2. The four rotary elements of the first differential gear device PG1 are assumed to be a first rotary element E1, a second rotary element E2, a third rotary element E3, and a fourth rotary element E4 in the order of rotational speed. Then, also in the present embodiment, the first sun gear S1 corresponds to the first rotary element E1, the carrier CA1 corresponds to the second rotary element E2, the ring gear R1 corresponds to the third rotary element E3, and the second sun gear S2 corresponds to the fourth rotary element E4.

In the present embodiment, the first sun gear S1 serving as the first rotary element E1 is configured to receive torque of the drive force source from the input shaft I through engagement of the third clutch C3. The first sun gear S1 is also configured to be fixed to the case CS through engagement of the first brake B1. The first sun gear S1 is drivably coupled to the sun gear S3 of the second differential gear device PG2.

The carrier CA1 serving as the second rotary element E2 is configured to receive torque of the drive force source from the input shaft I through engagement of the second clutch C2. The carrier CA1 serving as the second rotary element E2 is also configured to be fixed to the case CS through engagement of the second brake B2. The carrier CA1 is drivably coupled to the ring gear R2 of the second differential gear device PG2.

The ring gear R1 serving as the third rotary element E3 is drivably coupled to the output shaft O.

The second sun gear S2 serving as the fourth rotary element E4 is configured to receive torque of the drive force source from the input shaft I through engagement of the first clutch C1.

As seen from the above, the speed change mechanism TM includes not only the first sun gear S1 serving as the first rotary element E1 and the sun gear S3, the carrier CA1 serving as the second rotary element E2 and the ring gear R2, the ring gear R1 serving as the third rotary element E3, and the second sun gear S2 serving as the fourth rotary element E4, but also the carrier CA2 which falls between the first rotary element E1 and the second rotary element E2 in rotational speed. That is, the speed change mechanism TM is formed as a differential gear device including five rotary elements.

The friction engagement elements are selectively engaged on the basis of the operation table shown in FIG. 15 to establish each shift speed. FIG. 16 is a velocity diagram of the speed change mechanism TM according to the present embodiment. As shown in FIGS. 15 and 16, the first shift speed is established through engagement of the first clutch C1 and engagement of the second brake B2. That is, with the first clutch C1 engaged, the rotational drive force of the input shaft I is transferred as it is to the second sun gear S2 of the first differential gear device PG1. With the second brake B2 engaged, the carrier CA1 of the first differential gear device PG1 and the ring gear R2 of the second differential gear device PG2 are fixed to the case CS. This allows the rotational drive force of the second sun gear S2 to be reduced in speed on the basis of a predetermined tooth number ratio to be transferred to the output shaft O. Also in the present embodiment, the second brake B2, which is brought into the engaged state for establishment of the first shift speed, is brought into the slipping engagement state, in which there is slipping between input and output members of the second brake B2, in the slip travel mode. That is, the second brake B2 serves as the slip engagement element according to the present invention. In the slipping engagement state, the torque relationship and the rotational speed relationship vary in accordance with the amount of slipping. Also in the present embodiment, the first shift speed is used as the forward start shift speed, which is one of the shift speeds to be used for forward start.

The second shift speed is established through engagement of the first clutch C1 and engagement of the third brake B3. That is, with the first clutch C1 engaged, the rotational drive force of the input shaft I is transferred as. it is to the second sun gear S2 of the first differential gear device PG1. With the third brake B3 engaged, the carrier CA2 of the second differential gear device PG2 is fixed to the case CS. Then, the rotational drive force of the input shaft I is reduced in speed on the basis of a predetermined tooth number ratio to be transferred to the output shaft O.

The third shift speed is established through engagement of the first clutch C1 and engagement of the first brake B1. That is, with the first clutch C1 engaged, the rotational drive force of the input shaft I is transferred as it is to the second sun gear S2 of the first differential gear device PG1. With the first brake B1 engaged, the first sun gear S1 of the first differential gear device PG1 and the sun gear S3 of the second differential gear device PG2 are fixed to the case CS. Then, the rotational drive force of the input shaft I is reduced in speed on the basis of a predetermined tooth number ratio to be transferred to the output shaft O.

The fourth shift speed is established through cooperation among engagement of the first clutch C1, engagement of the second clutch C2, and engagement of the third clutch C3. That is, with the first clutch C1 engaged, the rotational drive force of the input shaft I is transferred as it is to the second sun gear S2 of the first differential gear device PG1. With the second clutch C2 engaged, the rotational drive force of the input shaft I is transferred as it is to the carrier CA1 of the first differential gear device PG1 and the ring gear R2 of the second differential gear device PG2. With the third clutch C3 engaged, the rotational drive force of the input shaft I is transferred as it is to the first sun gear S1 of the first differential gear device PG1. Then, with the first sun gear S1, the second sun gear S2, and the carrier CA1 rotating at the same speed as each other, the rotational drive force of the input shaft I is transferred as it is to the output shaft O.

The fifth shift speed is established through engagement of the second clutch C2 and engagement of the first brake B1. That is, with the second clutch C2 engaged, the rotational drive force of the input shaft I is transferred as it is to the carrier CA1 of the first differential gear device PG1 and the ring gear R2 of the second differential gear device PG2. With the first brake B1 engaged, the first sun gear S1 of the first differential gear device PG1 is fixed to the case CS. Then, the rotational drive force of the input shaft I is increased in speed on the basis of a predetermined tooth number ratio to be transferred to the output shaft O.

The sixth shift speed is established through engagement of the second clutch C2 and engagement of the third brake B3. That is, with the second clutch C2 engaged, the rotational drive force of the input shaft I is transferred as it is to the carrier CA1 of the first differential gear device PG1 and the ring gear R2 of the second differential gear device PG2. With the third brake B3 engaged, the carrier CA2 of the second differential gear device PG2 is fixed to the case CS. Then, the rotational drive force of the input shaft I is increased in speed on the basis of a predetermined tooth number ratio to be transferred to the output shaft O.

The first reverse shift speed is established through engagement of the third clutch C3 and engagement of the second brake B2. That is, with the third clutch C3 engaged, the rotational drive force of the input shaft I is transferred as it is to the first sun gear S1 of the first differential gear device PG1 and the sun gear S3 of the second differential gear device PG2. With the second brake B2 engaged, the carrier CA1 of the first differential gear device PG1 and the ring gear R2 of the second differential gear device PG2 are fixed to the case CS. Then, the rotational drive force of the input shaft I is reduced in speed on the basis of a predetermined tooth number ratio and reversed to be transferred to the output shaft O. Also in the present embodiment, the second brake B2, which is brought into the engaged state for establishment of the first reverse shift speed, is brought into the slipping engagement state, in which there is slipping between input and output members of the second brake B2, in the slip travel mode. That is, the second brake B2 serves as the slip engagement element according to the present invention. In the slipping engagement state, the torque relationship and the rotational speed relationship vary in accordance with the amount of slipping. In the present embodiment, the first reverse shift speed is used as the reverse start shift speed, which is one of the shift speeds to be used for reverse start.

The second reverse shift speed is established through engagement of the third clutch C3 and engagement of the third brake B3. That is, with the third clutch C3 engaged, the rotational drive force of the input shaft I is transferred as it is to the first sun gear S I of the first differential gear device PG1 and the sun gear S3 of the second differential gear device PG2. With the third brake B3 engaged, the carrier CA2 of the second differential gear device PG2 is fixed to the case CS.

Then, the rotational drive force of the input shaft I is reduced in speed on the basis of a predetermined tooth number ratio and reversed to be transferred to the output shaft O.

In the case where the slip travel mode is selected as the travel mode, as in the first embodiment, the shift control apparatus 31 according to the present embodiment performs slip control in which a slip engagement element, which is one of the friction engagement elements for establishment of a shift speed, is controlled to the slipping engagement state in which there is slipping between input and output members of the slip engagement element. Also in the present embodiment, with the vehicle speed (rotational speed of the output shaft O) around zero and with the first shift speed or the first reverse shift speed determined as the target shift speed, the direct-coupling input rotational speed may be less than the determination rotational speed, and the slip travel mode may be selected. Also in the present embodiment, the second brake B2, which is a friction engagement element to be engaged commonly for establishment of at least the forward start shift speed, which is one of the shift speeds to be used for forward start, and the reverse start shift speed, which is one of the shift speeds to be used for reverse start, is determined as the slip engagement element.

[Other Embodiments]

Lastly, other embodiments of the present invention will be described. The configuration of each embodiment described below is not limited to its independent application, and may be applied in combination with the configuration of other embodiments unless any contradiction occurs.

(1) In each of the embodiments described above, the second brake B2 serving as the slip engagement element for the first shift speed used as the forward start shift speed is disengaged for establishment of the second shift speed with the second lowest speed ratio next to the speed ratio of the forward start shift speed. However, the present invention is not limited thereto. That is, in one preferred embodiment of the present invention, a friction engagement element serving as the slip engagement element for the forward start shift speed may also be brought into the engaged state for a forward shift speed with the second lowest speed ratio next to the speed ratio of the forward start shift speed.

Figure 17:
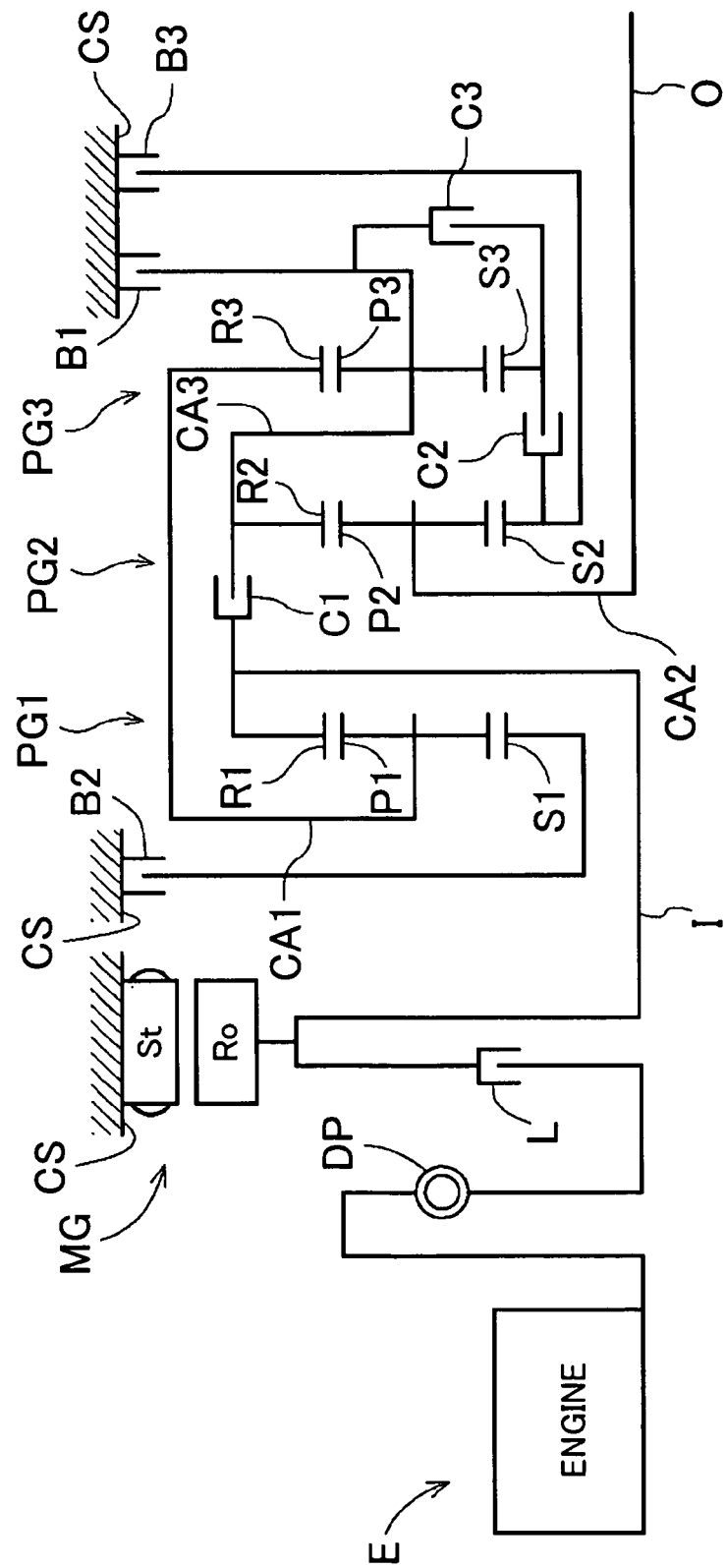
FIG. 17 is a skeleton diagram of a speed change device according to a different embodiment of the present invention.

In this case, the speed change device 1 may include the speed change mechanism TM such as that shown in an exemplary skeleton diagram of FIG. 17, and the friction engagement elements of the speed change mechanism TM may be selectively engaged on the basis of an exemplary operation table shown in FIG. 18 to establish each shift speed. In the example shown in FIG. 17, the speed change mechanism TM is formed by assembling three differential gear devices PG1, PG2, and PG3 to each other, the differential gear devices PG1, PG2, and PG3 each being formed by a single-pinion planetary gear mechanism. The first differential gear device PG1 includes a sun gear S1, a carrier CA1, a ring gear R1, and a plurality of pinion gears P1. The second differential gear device PG2 includes a sun gear S2, a carrier CA2, a ring gear R2, and a plurality of pinion gears P2. The third differential gear device PG3 includes a sun gear S3, a carrier CA3, a ring gear R3, and a plurality of pinion gears P3. In addition, the speed change mechanism TM includes, as a plurality of friction engagement elements, a first clutch C1, a second clutch C2, a third clutch C3, a first brake B1, a second brake B2, and a third brake B3. The rotary elements of the differential gear devices are configured to be drivably coupled to each other via engagement of coupling members and the friction engagement elements as shown in the example of FIGS. 17 and 18 to establish each shift speed.

In the speed change device 1 according to the example shown in FIGS. 17 and 18, the first shift speed (1st) is used as a forward start shift speed, which is one of the shift speeds to be used for forward start, and the first reverse shift speed (Rev1) is used as a reverse start shift speed, which is one of the shift speeds to be used for reverse start. The second brake B2, which is used commonly for the first shift speed and the first reverse shift speed, serves as the slip engagement element. The second brake B2 serving as the slip engagement element for the first shift speed used as the forward start shift speed is also engaged for establishment of the second shift speed with the second lowest speed ratio next to the speed ratio of the forward start shift speed.

(2) In each of the embodiments described above, the first shift speed, which is a forward shift speed with the highest speed ratio, is used as the forward start shift speed, the first reverse shift speed, which is a reverse shift speed with the highest speed ratio, is used as the reverse start shift speed, and the second brake B2, which is a friction engagement element to be engaged commonly for establishment of the first shift speed and the first reverse shift speed, serves as the slip engagement element. However, the present invention is not limited thereto. That is, in one preferred embodiment of the present invention, a forward shift speed other than the forward shift speed with the highest speed ratio may be used as a second forward start shift speed, which is one of forward start shift speeds, a reverse shift speed other than the reverse shift speed with the highest speed ratio may be used as a second reverse start shift speed, which is one of reverse start shift speeds, and a friction engagement element to be engaged commonly for establishment of at least one of the forward start shift speed and the second forward start shift speed and at least one of the reverse start shift speed and the second reverse start shift speed may serve as the slip engagement element.

For example, in one preferred embodiment of the present invention, which is a modification of the fourth embodiment of the present invention described in relation to FIGS. 14 to 16, the second shift speed, which is a forward shift speed with the second highest speed ratio, may be used as the forward start shift speed, and the second reverse shift speed, which is a reverse shift speed with the second highest speed ratio, may be used as the reverse start shift speed. In this case, as shown in the operation table of FIG. 19 which is used in place of the operation table of FIG. 15, the third brake B3, which is to be engaged commonly for establishment of the second shift speed and the second reverse shift speed, serves as the slip engagement element. That is, the third brake B3 serves as the slip engagement element in the slip travel mode for the second shift speed and the second reverse shift speed. In the example, the third brake B3 serving as the slip engagement element is also engaged for establishment of the sixth shift speed. Thus, only the sixth shift speed may be used as the forward start shift speed to be used for forward start, and both the second shift speed and the sixth shift speed may be selectively used as the forward start shift speed. In the case where the sixth shift speed is used as the forward start shift speed, the slip travel mode is also executed for the sixth shift speed. In this case, the third brake B3 is brought into the slipping engagement state, in which there is slipping between input and output members of the third brake B3, in the slip travel mode for the sixth shift speed.

Alternatively, in the speed change device 1 shown in FIGS. 17 and 18, for example, the second shift speed with the second highest speed ratio may be used as the second forward start shift speed, which is one of forward start shift speeds, and the second brake B2, which is a friction engagement element to be engaged commonly for establishment of the second shift speed and the first reverse shift speed used as the reverse start shift speed may serve as the slip engagement element.

(3) In each of the embodiments described above, the second brake B2 serves as the slip engagement element which is to be engaged commonly for establishment of the first shift speed used as the forward start shift speed and the first reverse shift speed used as the reverse start shift speed. However, the present invention is not limited thereto. That is, in one preferred embodiment of the present invention, a friction engagement element other than a brake, for example a clutch, may serve as the slip engagement element which is to be engaged commonly for establishment of the forward start shift speed and the reverse start shift speed.

In this case, in the speed change device 1 according to the example shown in FIGS. 17 and 18, the second clutch C2, which is a friction engagement element to be engaged commonly for establishment of the first shift speed used as the forward start shift speed and the second reverse shift speed used as the reverse start shift speed may serve as the slip engagement element.

(4) In each of the embodiments described above, the speed change device 1 includes the engine separation clutch L which selectively drivably couples the engine E to the input shaft I. However, the present invention is not limited thereto. That is, it is also preferred that the speed change device 1 does not include the engine separation clutch L, and that the engine E is drivably coupled to the input shaft I, either integrally or via the damper DP.

(5) In each of the embodiments described above, the speed change device 1 includes the damper DP, and the engine E is drivably coupled to the engine separation clutch L via the damper DR However, the present invention is not limited thereto. That is, it is also preferred that the speed change device 1 does not include the damper DP, and that the engine E is integrally drivably coupled to one of the engagement members of the engine separation clutch L.

(6) In each of the embodiments described above, the shift control apparatus 31 includes the control sections 40 to 42. However, the present invention is not limited thereto. That is, in one preferred embodiment of the present invention, the shift control apparatus 31 may be integrated with one or a plurality of the engine control section 33, the rotary electric machine control section 34, the engine separation clutch control section 35, and the integration control section 36.

(7) In each of the embodiments described above, the slip travel mode is executed at least on condition that the vehicle is in a drive mode in which a drive force is produced through combustion in the engine E. However, the present invention is not limited thereto. That is, in one preferred embodiment of the present invention, the slip travel mode may also be executed in a drive mode in which the rotary electric machine MG produces a drive force without combustion in the engine E such as the electric drive mode and the regenerative electric power generation mode.

In this case, the predetermined determination rotational speed for selecting the slip travel mode may be set to a rotational speed at which the drive efficiency of the rotary electric machine MG is high or a rotational speed at which there are less variations in output torque of the rotary electric machine MG Then, the slip control section 42 may control the slip engagement element to the slipping engagement state such that the magnitude of speed change mechanism transfer torque, which is torque transferred from the input shaft I to the side of the wheels, is restricted with respect to the magnitude of drive force source output torque, which is torque transferred from the drive force source to the input shaft I, such that the rotational speed of the input shaft I does not fall below the determination rotational speed set for the rotary electric machine MG.

The present invention may be suitably applied to a speed change device including an input member drivably coupled to an internal combustion engine and a rotary electric machine each serving as a drive force source for a vehicle, an output member drivably coupled to wheels, and a speed change mechanism in which a plurality of shift speeds are established in accordance with respective engagement states of a plurality of friction engagement elements to transfer rotation of the input member to the output member with the rotational speed changed with the speed ratio of each shift speed, and to a shift control apparatus that controls the speed change device.

The invention claimed is:

1. A speed change device, comprising:
an input member drivably coupled to an internal combustion engine and a rotary electric machine each serving as a drive force source for a vehicle;
an output member drivably coupled to wheels; and
a speed change mechanism including a plurality of friction engagement elements, a plurality of shift speeds being established in accordance with respective engagement states of the plurality of friction engagement elements, the speed changing mechanism being connected to the input member and transferring rotation of the engine and the rotary electric machine transferred to the input member to the output member with a speed of the rotation changed with a speed ratio of each of the plurality of shift speeds, wherein:
a slip travel mode is provided in which the vehicle is run while transferring torque from the input member to the output member with one of the plurality of friction engagement elements being caused to slip, the slip travel mode including an engine electric power generation mode in which the vehicle is run while the rotary electric machine is generating electric power using the drive force of the engine, and
a slip engagement element, which is the friction engagement element caused to slip in the slip travel mode, is the friction engagement element to be engaged commonly for establishment of at least a forward start shift speed, which is one of the shift speeds to be used for forward start, and a reverse start shift speed, which is one of the shift speeds to be used for reverse start, the slip engagement element being the friction engagement element caused to slip in the engine electric power generation mode.

2. The speed change device according to claim 1, wherein the slip engagement element is the friction engagement element to be disengaged for establishment of a forward shift speed with the second lowest speed ratio next to the speed ratio of the forward start shift speed.

3. The speed change device according to claim 1, wherein:
the plurality of friction engagement elements include at least a clutch and a brake; and
the slip engagement element is the brake.

4. The speed change device according to claim 2, wherein:
the plurality of friction engagement elements include at least a clutch and a brake; and
the slip engagement element is the brake.

5. The speed change device according to claim 1, wherein:
the plurality of friction engagement elements are brakes or clutches;
the speed change mechanism includes a differential gear device including at least four rotary elements that are a first rotary element, a second rotary element, a third rotary element, and a fourth rotary element in the order of rotational speed;
the first rotary element is configured to receive torque transferred from the input member through engagement of a third clutch, and to be fixed to a non-rotary member through engagement of a first brake;
the second rotary element is configured to receive torque transferred from the input member through engagement of a second clutch, and to be fixed to a non-rotary member through engagement of a second brake;
the third rotary element is drivably coupled to the output member;
the fourth rotary element is configured to receive torque transferred from the input member through engagement of a first clutch; and
the slip engagement element is the second brake.

6. The speed change device according to claim 2, wherein:
the plurality of friction engagement elements are brakes or clutches;
the speed change mechanism includes a differential gear device including at least four rotary elements that are a first rotary element, a second rotary element, a third rotary element, and a fourth rotary element in the order of rotational speed;
the first rotary element is configured to receive torque transferred from the input member through engagement of a third clutch, and to be fixed to a non-rotary member through engagement of a first brake;
the second rotary element is configured to receive torque transferred from the input member through engagement of a second clutch, and to be fixed to a non-rotary member through engagement of a second brake;
the third rotary element is drivably coupled to the output member;
the fourth rotary element is configured to receive torque transferred from the input member through engagement of a first clutch; and
the slip engagement element is the second brake.

7. The speed change device according to claim 3, wherein:
the plurality of friction engagement elements are brakes or clutches;
the speed change mechanism includes a differential gear device including at least four rotary elements that are a first rotary element, a second rotary element, a third rotary element, and a fourth rotary element in the order of rotational speed;
the first rotary element is configured to receive torque transferred from the input member through engagement of a third clutch, and to be fixed to a non-rotary member through engagement of a first brake;
the second rotary element is configured to receive torque transferred from the input member through engagement of a second clutch, and to be fixed to a non-rotary member through engagement of a second brake;
the third rotary element is drivably coupled to the output member;
the fourth rotary element is configured to receive torque transferred from the input member through engagement of a first clutch; and
the slip engagement element is the second brake.

8. The speed change device according to claim 4, wherein:
the plurality of friction engagement elements are brakes or clutches;
the speed change mechanism includes a differential gear device including at least four rotary elements that are a first rotary element, a second rotary element, a third rotary element, and a fourth rotary element in the order of rotational speed;
the first rotary element is configured to receive torque transferred from the input member through engagement of a third clutch, and to be fixed to a non-rotary member through engagement of a first brake;
the second rotary element is configured to receive torque transferred from the input member through engagement of a second clutch, and to be fixed to a non-rotary member through engagement of a second brake;
the third rotary element is drivably coupled to the output member;
the fourth rotary element is configured to receive torque transferred from the input member through engagement of a first clutch; and
the slip engagement element is the second brake.

9. A shift control apparatus that controls a speed change device including an input member drivably coupled to an internal combustion engine and a rotary electric machine each serving as a drive force source for a vehicle, an output member drivably coupled to wheels, and a speed change mechanism including a plurality of friction engagement elements, a plurality of shift speeds being established in accordance with respective engagement states of the plurality of friction engagement elements, the speed changing mechanism being connected to the input member and transferring rotation of the engine and the rotary electric machine transferred to the input member to the output member with a speed of the rotation changed with a speed ratio of each of the plurality of shift speeds, wherein:
a slip travel mode, in which the vehicle is run while transferring torque from the input member to the output member with one of the plurality of friction engagement elements being caused to slip, can be executed, the slip travel mode including an engine electric power generation mode in which the vehicle is run while the rotary electric machine is generating electric power using the drive force of the engine; and
a slip engagement element, which is the friction engagement element caused to slip in the slip travel mode, is the friction engagement element to be engaged commonly for establishment of at least a forward start shift speed, which is one of the shift speeds to be used for forward start, and a reverse start shift speed, which is one of the shift speeds to be used for reverse start, the slip engagement element being the friction engagement element caused to slip in the engine electric power generation mode.

10. The speed change device according to claim 1, wherein an engine separation clutch connects and disconnects the engine and the input member, and
the rotary electric machine is drivably coupled to the input member so as to rotate together with the input member.

11. The shift control apparatus according to claim 9, wherein
an engine separation clutch connects and disconnects the engine and the input member, and
the rotary electric machine is drivably coupled to the input member so as to rotate together with the input member.

* * * * *